US008009375B2

(12) United States Patent
Arai et al.

(10) Patent No.: US 8,009,375 B2
(45) Date of Patent: *Aug. 30, 2011

(54) APPARATUS AND METHOD FOR RECEIVING AND RECORDING DIGITAL INFORMATION

(75) Inventors: Hideo Arai, Chigasaki (JP); Hitoaki Owashi, Yokohama (JP); Kyoichi Hosokawa, Yokohama (JP); Keizo Nishimura, Yokosuka (JP); Yoshizumi Watatani, Fujisawa (JP); Akira Shibata, Katsuta (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1187 days.

This patent is subject to a terminal disclaimer.

(21) Appl. No.: 11/305,229

(22) Filed: Dec. 19, 2005

(65) Prior Publication Data

US 2006/0093332 A1 May 4, 2006

Related U.S. Application Data

(60) Continuation of application No. 10/404,452, filed on Apr. 2, 2003, now Pat. No. 7,012,769, which is a continuation of application No. 10/277,830, filed on Oct. 23, 2002, now Pat. No. 6,590,726, which is a continuation of application No. 09/809,047, filed on Mar. 16, 2001, now Pat. No. 6,498,691, which is a continuation of application No. 09/654,962, filed on Sep. 5, 2000, now Pat. No. 6,324,025, which is a continuation of application No. 09/567,005, filed on May 9, 2000, now Pat. No. 6,278,564, which is a continuation of application No. 09/326,595, filed on Jun. 7, 1999, now Pat. No. 6,069,757, which is a continuation of application No. 09/188,303, filed on Nov. 10, 1998, now Pat. No. 6,002,536, which is a continuation of application No. 08/917,176, filed on Aug. 25, 1997, now Pat. No. 5,862,004, which is a continuation of application No. 08/620,879, filed on Mar. 22, 1996, now Pat. No. 5,699,203, which is a continuation of application No. 08/457,597, filed on Jun. 1, 1995, now Pat. No. 5,530,598, which is a continuation of application No. 08/457,486, filed on Jun. 1, 1995, now Pat. No. 5,517,368, which is a continuation of application No. 08/238,528, filed on May 5, 1994, now Pat. No. 5,671,095, which is a division of application No. 07/727,059, filed on Jul. 8, 1991, now Pat. No. 5,337,199.

(30) Foreign Application Priority Data

Jul. 6, 1990 (JP) .................................... 02-177406
Jul. 20, 1990 (JP) .................................... 02-190655
Sep. 21, 1990 (JP) .................................... 02-250199

(51) Int. Cl.
*G11B 5/00* (2006.01)
(52) U.S. Cl. ............................................ 360/8; 386/328
(58) Field of Classification Search ................ 360/8, 27, 360/28, 29, 32, 39; 386/6, 7, 109
See application file for complete search history.

(56) References Cited

U.S. PATENT DOCUMENTS 4,378,593 A 3/1983 Yamamoto
(Continued)

FOREIGN PATENT DOCUMENTS

JP 61-152180 7/1986
(Continued)

OTHER PUBLICATIONS

Kubota, S. et al., "A Compact Spectrum and Interference-resistant Digital Video Transmission System" IEEE Global Telecommunications Conference & Exhibition, vol. 3, pp. 1729-1734, 1989.

(Continued)

*Primary Examiner* — Tan X Dinh
(74) *Attorney, Agent, or Firm* — Antonelli, Terry, Stout & Kraus, LLP.

(57) ABSTRACT

A digital information receiving apparatus and method in which a receiver receives a digital signal including a video signal and an audio signal, wherein the received video signal is bit-compressed by a first compression method and the received audio signal is bit-expanded by a second compression method which is different from the first compression method, a demodulator demodulates the received digital signal, and an expander bit-expands the demodulated digital signal.

32 Claims, 18 Drawing Sheets

U.S. PATENT DOCUMENTS

| | | | |
|---|---|---|---|
| 4,394,774 A | 7/1983 | Widergren et al. | |
| 4,542,417 A | 9/1985 | Ohta | |
| 4,542,419 A | 9/1985 | Morio et al. | |
| 4,544,958 A | 10/1985 | Odaka | |
| 4,608,609 A | 8/1986 | Takano | |
| 4,819,097 A | 4/1989 | Azuma | |
| 4,825,305 A | 4/1989 | Itoh | |
| 4,849,812 A | 7/1989 | Borgers et al. | |
| 4,862,292 A | 8/1989 | Enari et al. | |
| 4,949,173 A * | 8/1990 | Mitsuhashi | 348/143 |
| 4,961,204 A | 10/1990 | Tanaka | |
| 4,972,417 A | 11/1990 | Sako et al. | |
| 4,975,771 A | 12/1990 | Kassatly | |
| 5,010,391 A | 4/1991 | Shimokoriyama et al. | |
| 5,023,710 A | 6/1991 | Kondo et al. | |
| 5,032,927 A | 7/1991 | Watanabe et al. | |
| 5,057,932 A | 10/1991 | Lang | |
| 5,065,259 A | 11/1991 | Kubota et al. | |
| 5,070,503 A | 12/1991 | Shikakura | |
| 5,124,812 A * | 6/1992 | Sato et al. | 386/98 |
| 5,128,758 A | 7/1992 | Azadegan et al. | |
| 5,132,781 A | 7/1992 | Shimokoriyama et al. | |
| 5,136,641 A | 8/1992 | Gysel | |
| 5,157,557 A | 10/1992 | Oohashi | |
| 5,172,380 A * | 12/1992 | Odaka | 714/755 |
| 5,208,665 A | 5/1993 | McCalley et al. | |
| 5,218,454 A | 6/1993 | Nagawasa et al. | |
| 5,257,107 A | 10/1993 | Hwang et al. | |
| 5,267,094 A | 11/1993 | Aoki | |
| 5,309,290 A | 5/1994 | Sugiyama | |
| 5,335,116 A | 8/1994 | Onishi et al. | |
| 5,345,433 A * | 9/1994 | Ohga et al. | 369/47.29 |
| 5,377,050 A | 12/1994 | Yun | |
| 5,440,432 A | 8/1995 | Aoki | |
| 5,469,272 A | 11/1995 | Kubota | |
| 5,491,481 A | 2/1996 | Akagiri | |
| 5,548,574 A | 8/1996 | Shimoyoshi | |
| 5,552,896 A * | 9/1996 | Yoshida | 386/105 |
| 5,572,331 A | 11/1996 | Yu | |
| 5,585,933 A | 12/1996 | Ichige et al. | |
| 5,590,108 A | 12/1996 | Mitsuno et al. | |
| 5,627,935 A | 5/1997 | Kim | |
| 5,648,948 A | 7/1997 | Itoh | |
| 5,712,946 A | 1/1998 | Yanagihara | |
| 5,742,444 A | 4/1998 | Ozue | |
| 5,761,642 A | 6/1998 | Suzuki et al. | |
| 5,808,750 A | 9/1998 | Yang et al. | |
| 5,818,652 A | 10/1998 | Ozaki et al. | |
| 5,844,736 A | 12/1998 | Fukuda et al. | |
| 5,872,885 A | 2/1999 | Park et al. | |
| 5,875,279 A | 2/1999 | Owashi et al. | |
| 5,878,188 A * | 3/1999 | Amada et al. | 386/101 |
| 5,889,921 A | 3/1999 | Sugiyama et al. | |
| 6,009,235 A | 12/1999 | Kim | |
| 6,049,517 A | 4/2000 | Tsutsui | |
| 6,061,497 A | 5/2000 | Sasaki | |
| 6,084,730 A | 7/2000 | Ikeda et al. | |
| 6,205,104 B1 | 3/2001 | Nagashima | |
| 6,339,676 B1 | 1/2002 | Amada | |
| 7,197,232 B2 * | 3/2007 | Amada et al. | 386/94 |

FOREIGN PATENT DOCUMENTS

| | | |
|---|---|---|
| JP | 62-13177 | 1/1987 |
| JP | 62-252288 | 11/1987 |
| JP | 63-28143 | 2/1988 |
| JP | 63-028143 | 2/1988 |
| JP | 63-32767 | 2/1988 |
| JP | 63-032767 | 2/1988 |
| JP | 63-175266 | 7/1988 |
| JP | 64-058195 | 3/1989 |
| JP | 64-060171 | 3/1989 |
| JP | 64-60171 | 3/1989 |
| JP | 64-73560 | 3/1989 |
| JP | 64-082711 | 3/1989 |
| JP | 64-82711 | 3/1989 |
| JP | 64-89878 | 4/1989 |
| JP | 1-114176 | 5/1989 |
| JP | 1-125186 | 5/1989 |
| JP | 1-223669 | 9/1989 |
| JP | 1-276470 | 11/1989 |
| JP | 2-14619 | 1/1990 |
| JP | A-H2-30238 | 1/1990 |
| JP | A-H2-30239 | 1/1990 |
| JP | 2-44826 | 2/1990 |
| JP | 2-108279 | 4/1990 |
| JP | 2-62856 | 5/1990 |
| JP | 90655/90 | 5/1999 |
| JP | 190655/90 | 5/1999 |
| JP | 105643-97 | 6/1999 |
| JP | 163728/97 | 6/1999 |

OTHER PUBLICATIONS

Degoulet et al, Article No. 40, "EPEOS—Automatic Program Recording System", Nov. 1975.

Digital Information Recording and Reproducing Device, Reception Recording And Reproducing Device And Their Methods, Arai et al, JP 2000-059, Feb. 25, 2000 (Abstract Only).

Interdepartmental Correspondence, Hughes Communications, Jun. 15, 1990, "Sky Cable RFI".

General Instrument Corporation Videocipher Division, "Digicipher HDTV System", San Diego, California, Jun. 8, 1990.

Woo Paik, General Instrument Corporation, "Digicipher—All Digital, Channel Compatible, HDTV Broadcast System", IEEE Transactions on Broadcasting, vol. 36, No. 4, Dec. 1990 pp. 245-254, San Diego, California.

Third International Workshop on HDTV, Aug. 30-31-Sep. 1, 1989, Torino, Italy, Proceedings, vol. III.

A 34 MBIT/S Codec For High Quality Television Transmission, T. Langlais et al, TRT—Telecommunications Radioelectriques et Telephoniques, IEEE, Les Plessis—Robinson, France pp. 569-574, 1989.

"120 Mbps HDTV Codec and Its Performance in a Field Trial", Third International Workshop on HDTV, Aug. 30-31-Sep. 1, 1989, Torino, Italy, Proceedings, vol. III.

* cited by examiner

FIG. 8

| ITEM | | FIELD FREQUENCY | TRANSMISSION RATE | DATA COMPRESSION | TIME-BASE COMPRESSION |
|---|---|---|---|---|---|
| INPUT | | | | | |
| STANDARD SPEED | ANALOG | 59.94 Hz | (AFTER A/D) 114 Mbps | ABSENCE | ABSENCE |
| | DIGITAL | | 114 Mbps | | |
| HIGH SPEED | DIGITAL | 59.94 Hz | 100 Mbps | PRESENCE 1/11.4 | PRESENCE 1/10 |

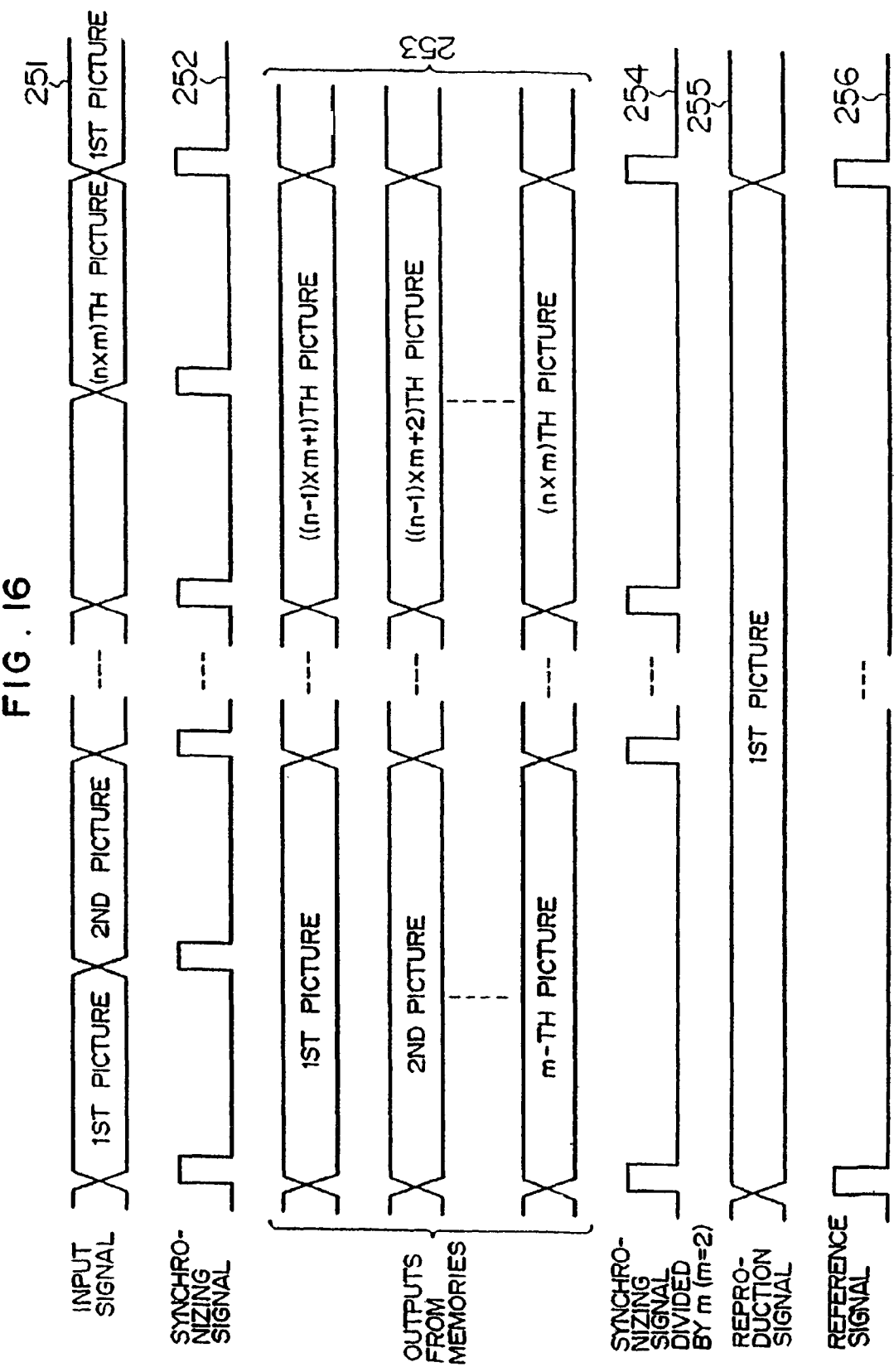

FIG. 17

| SYSTEM | MODE | | TAPE SPEED (RATIO TO STANDARD SPEED) | | CYLINDER ROTATION SPEED (rpm) | | NUMBER OF HEAD PAIRS | | CYLINDER DIAMETER (mmφ) | CYLINDER CONTACT ANGLE (deg) | NUMBER OF TRACKS REQUIRED FOR ONE PICTURE | REMARKS |
|---|---|---|---|---|---|---|---|---|---|---|---|---|
| | REC | PB | REC | PB | REC | PB | REC | PB | | | | |
| VHS (NTSC) | NORMAL SPEED | NORMAL SPEED | — | — | 1800 | 1800 | — | — | 62 | 180 | — | |
| D2 (NTSC) | NORMAL SPEED | NORMAL SPEED | — | — | 5400 | 5400 | 2 | 2 | 96 | 180 | 6 | |
| EXAMPLE ① | HIGH SPEED | NORMAL SPEED | 10 | — | 9000 | 900 | — | — | 120 | 180 | 1/2 | |
| | HIGH SPEED | HIGH SPEED | 10 | 10 | 9000 | 9000 | | | | | | |
| | NORMAL SPEED | HIGH SPEED | — | 10 | 900 | 9000 | | | | | | |
| EXAMPLE ② | NORMAL SPEED | HIGH SPEED | — | 10 | 900 | 9000 | — | — | 90 | 270 | 1/2 | |
| | HIGH SPEED | HIGH SPEED | 10 | 10 | 9000 | 9000 | | | | | | |
| | HIGH SPEED | NORMAL SPEED | 10 | — | 9000 | 900 | | | | | | |
| EXAMPLE ③ | HIGH SPEED | NORMAL SPEED | 10 | — | 18000 | 1800 | — | — | 60 | 180 | — | |
| | HIGH SPEED | HIGH SPEED | 10 | 10 | 18000 | 18000 | | | | | | |
| | NORMAL SPEED | HIGH SPEED | — | 10 | 1800 | 18000 | | | | | | |
| EXAMPLE ④ | NORMAL SPEED | HIGH SPEED | — | 10 | 900 | 9000 | 2 | 2 | 60 | 180 | — | |
| | HIGH SPEED | HIGH SPEED | 10 | 10 | 9000 | 9000 | | | | | | |
| | HIGH SPEED | NORMAL SPEED | 10 | — | 9000 | 900 | | | | | | |
| EXAMPLE ⑤ | HIGH SPEED | NORMAL SPEED | 10 | — | 9000 | 1800 | 2 | — | 60 | 180 | — | MOVABLE HEADS ARE REQUIRED |
| | HIGH SPEED | HIGH SPEED | 10 | 10 | 9000 | 9000 | 2 | 2 | | | | |
| | NORMAL SPEED | HIGH SPEED | — | 10 | 1800 | 9000 | — | 2 | | | | |

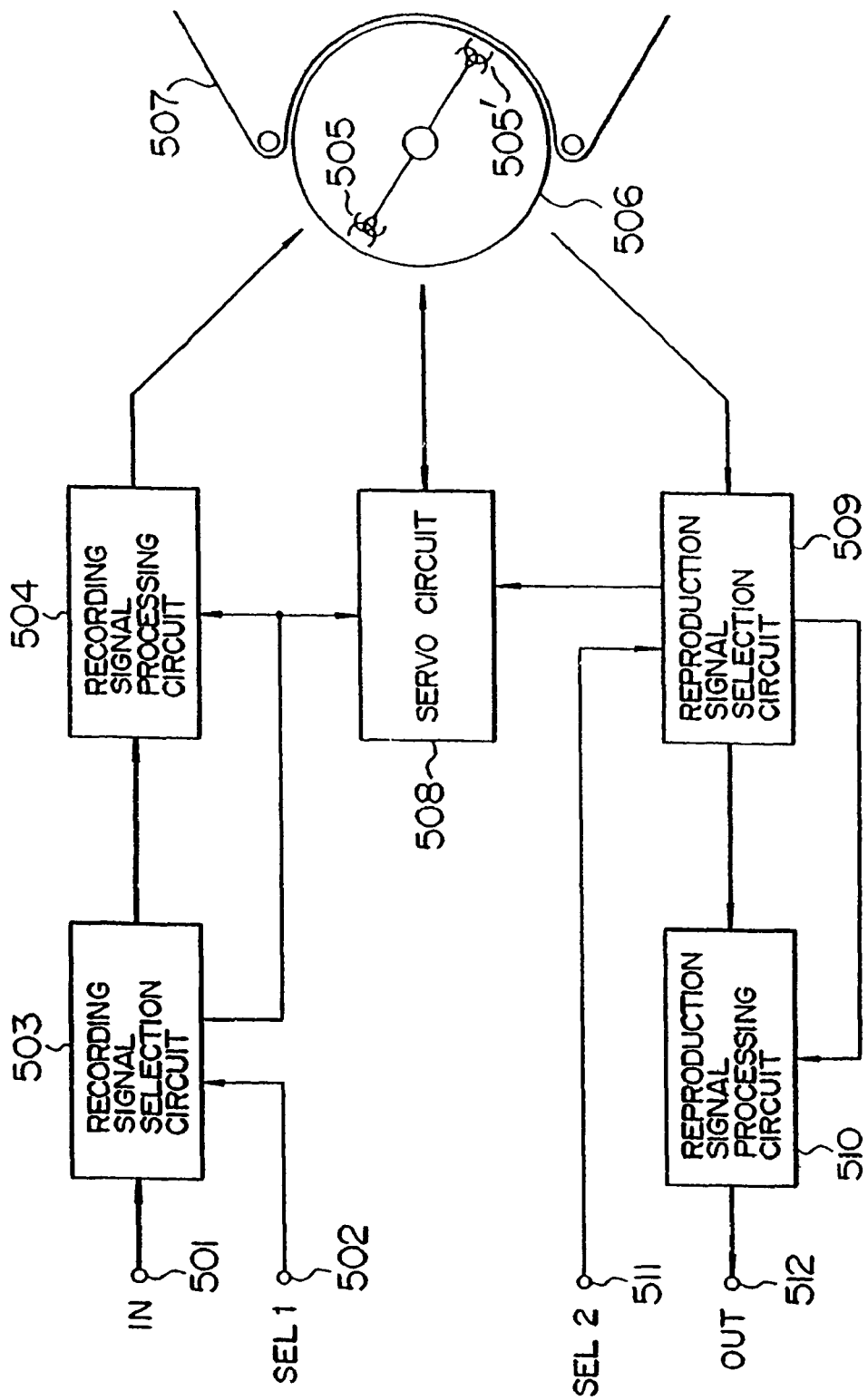

APPARATUS AND METHOD FOR RECEIVING AND RECORDING DIGITAL INFORMATION

CROSS REFERENCE TO RELATED APPLICATIONS

This is a continuation of U.S. application Ser. No. 10/404,452, filed Apr. 2, 2003, now U.S. Pat. No. 7,012,769, which is a continuation application of U.S. application Ser. No. 10/277,830, filed Oct. 23, 2002, now U.S. Pat. No. 6,590,726, which is a continuation of U.S. Ser. No. 09/809,047, filed Mar. 16, 2001, now U.S. Pat. No. 6,498,691, which is a continuation application of U.S. application Ser. No. 09/654,962, filed Sep. 5, 2000, now U.S. Pat. No. 6,324,025, which is a continuation of U.S. Ser. No. 09/567,005, filed May 9, 2000, now U.S. Pat. No. 6,278,564, which is a continuation application of U.S. Ser. No. 09/326,595, filed Jun. 7, 1999, now U.S. Pat. No. 6,069,757, which is a continuation of U.S. application Ser. No. 09/188,303, filed Nov. 10, 1998, now U.S. Pat. No. 6,002,536, which is a continuation of U.S. application Ser. No. 08/917,176, filed Aug. 25, 1997, now U.S. Pat. No. 5,862,004, which is a continuation of U.S. application Ser. No. 08/620,879, filed Mar. 22, 1996, now U.S. Pat. No. 5,699,203, and with U.S. application Ser. No. 08/620,880, filed Mar. 22, 1996, now U.S. Pat. No. 5,673,154, which are continuations of U.S. application Ser. No. 08/457,597, filed Jun. 1, 1995, now U.S. Pat. No. 5,530,598, which is a continuation of U.S. application Ser. No. 08/457,486, filed Jun. 1, 1995, now U.S. Pat. No. 5,517,368, which is a continuation of U.S. application Ser. No. 08/238,528, filed May 5, 1994, now U.S. Pat. No. 5,671,095, which is a divisional of U.S. application Ser. No. 07/727,059, filed Jul. 8, 1991, now U.S. Pat. No. 5,337,199, the subject matter of which are incorporated by reference herein.

BACKGROUND OF THE INVENTION

The present invention relates to a system for transmitting a digital video signal and recording the received video signal. More particularly, the present invention relates to great extension of the range of use of a digital signal recording/reproducing system by greatly shortening a recording time through transmission of a video signal in a compressed form, and further relates to great extension of the range of use of a digital signal recording/reproducing system by making the number of signals to be recorded and a recording/reproducing time variable.

As a digital magnetic recording/reproducing system (hereinafter referred to as VTR) is conventionally known, for example, a D2 format VTR. In such a conventional digital VTR, the elongation or shortening of a reproducing time is possible by using variable-speed reproduction. However, the prior art reference does not at all disclose high-speed recording in which a recording time is shortened to 1/m, multiple recording in which a plurality of signals are recorded, and the compression/expansion of a recording/reproducing time.

The above-mentioned conventional digital VTR has a feature that a high quality is attained and there is no deterioration caused by dubbing. However, the shortening of a dubbing time is not taken into consideration. Therefore, for example, in the case where a two-hour program is to be recorded, two hours are required. Thus, there is a drawback that inconveniences are encountered in use. Also, the multiplexing of recording signals is not taken into consideration. Therefore, for example, when two kinds of programs are to be simultaneously recorded or reproduced, two VTR's are required. This also causes inconveniences in use.

SUMMARY OF THE INVENTION

An object of the present invention is to provide a digital VTR in which high-speed recording onto a tape can be made with the same format as that used in standard-speed recording, to provide a transmission signal processing system for transmitting at a high speed a video signal to be recorded by such a digital VTR, and to extend the range of use of the digital VTR by shortening a recording time. For example, the digital VTR can be used in such a manner that a two-hour program is recorded in about ten minutes and is reproduced at a standard speed.

The above object is achieved as follows. A video signal and an audio signal are subjected to time-base compression to 1/m, bit compression to 1/n, addition of a parity signal and modulation, and are thereafter transmitted or outputted. The transmitted signal is received, is subjected to demodulation, error correction, addition of a parity signal and modulation, and is thereafter recorded, onto a magnetic tape which travels at a travel speed m times as high as that upon normal reproduction, by use of a magnetic head on a cylinder which rotates at a frequency m times as high as that upon normal reproduction. The signal on the magnetic tape traveling at a travel speed upon normal reproduction is reproduced by a magnetic head on the cylinder which rotates at a frequency upon normal reproduction. The reproduced signal is subjected to demodulation, error correction, bit expansion of video and audio signals and D/A conversion, and is thereafter outputted. Address signals corresponding to a plurality of VTR's may be transmitted prior to a signal to be recorded. Further, control signals indicative of the start of recording and the stop of recording may be transmitted. The transmitted signals are received and error-corrected, and controls of the standby for recording, the start of recording and the stop of recording are made on the basis of the control signals.

With the above construction, since the video signal and the audio signal are time-base compressed to 1/m and bit-compressed to 1/n, a transmission time is shortened to 1/m and a signal band turns to m/n. The time-base compressed and bit-compressed signal is transmitted after addition of a parity signal for error correction and modulation to a code adapted for a transmission path. The transmitted signal is received and demodulated. The detection of an error produced in a transmitting system and the correction for the error can be made using the added parity signal. The error-corrected signal is added with a parity signal for correction for an error produced in a magnetic recording/reproducing system and is modulated to a code adapted for the magnetic recording/reproducing system. Upon recording, since the rotation frequency of the cylinder and the travel speed of the magnetic tape are increased by m times, the recording onto the magnetic tape can be made at an m-tuple speed. Upon reproduction, by setting the rotation frequency of the cylinder and the travel speed of the magnetic tape to normal ones, the reproduction at a normal speed can be made. The reproduced signal is code-demodulated. The detection of an error produced in the magnetic recording/reproducing system and the correction for the error can be made on the basis of the parity signal. By bit-expanding the video signal and the audio signal compressed by the transmission signal processing system, the original video and audio signal can be restored. The bit-expanded signal is converted into an analog signal by a D/A converter. Simultaneous and selective control of the start/stop of recording for a multiplicity of VTR's can be made in such a manner that the address signals corresponding to the VTR's are transmitted prior to a signal to be recorded, the correction for an error of the received signal is made, required VTR's are brought into recording standby conditions by the corrected address signals, and the controls of the start of recording and the stop of recording are made by the transmitted control signals.

Another object of the present invention is to provide a digital signal recording/reproducing system in which multiple recording onto a tape can be made with the same format as that used in standard recording and simultaneous multiple reproduction is possible, and to extend the range of use of a digital VTR by compressing/expanding a recording/reproducing time in accordance with the transmission rate of a multiplexed input/output signal and the number of signals in the multiplexed input/output signal.

This object is achieved as follows. There are provided means for selecting one or plural desired signals from a time-base compressed and time-division multiplexed digital input signal, and helical scan recording means for making time-division multiplex recording of the selected signals with a time-base compressed speed after selection being retained. There is further provided means for reproducing the recorded signals with the rotation speed of a cylinder, a tape speed and so on being set to values proportional to the transmission rate of a reproduction signal and the number of signals to be simultaneously reproduced and with the signal being time-base expanded or being retained as time-base compressed.

With the above construction, N kinds of desired signals selected from the multiplexed input digital signal and time-base compressed to 1/K are subjected to time-division multiplex recording with a time-base compressed speed after selection being retained. Upon reproduction, for example, if both the cylinder rotation speed and the tape speed are set to N/K times, a recording track and a reproducing track coincide with each other and the use of a reproducing time K/N times as long as a recording time enables the reproduction of each of the N kinds of signals at a standard speed. Also, if both the cylinder rotation speed and the tape speed are set to (M×N)/K times, a recording track and a reproducing track coincide with each other and the use of a reproducing time as K/(M×N) times as long as the recording time enables the reproduction of each of the N kinds of signals at an M-tuple speed. In the case where L kinds of signals are selected from among the N kinds of reproduced signals and a processing speed at a reproduction signal processing circuit is set to L×M times as long as a standard reproduction processing speed, each of the L kinds of signals among the N kinds of multiple-recorded signals is outputted at a speed M times as high as a standard speed.

BRIEF DESCRIPTION OF THE DRAWINGS

FIG. 8 shows one example of the specification of signals to be recorded;

FIG. 16 is a timing chart showing the waveforms of signals involved in the example shown in FIG. 15;

FIG. 17 is a table showing some applications of the examples shown in FIGS. 13 and 15;

FIG. 18 is a block diagram of a still furthermore embodiment of the present invention.

DESCRIPTION OF THE PREFERRED EMBODIMENTS

Figure 1:
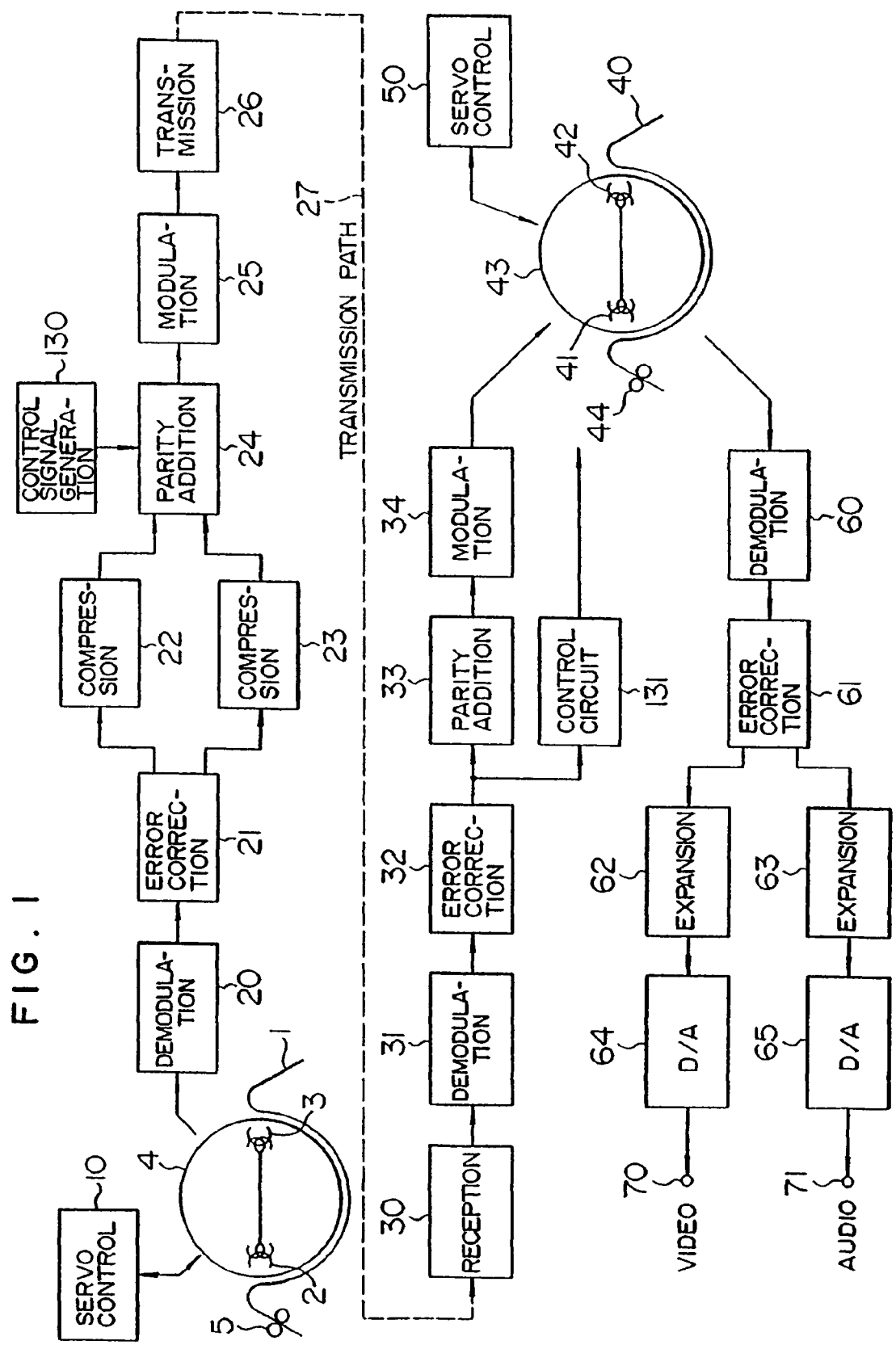
FIG. 1 is a block diagram of a digital transmission signal processing system and a recording/reproducing system according to an embodiment of the present invention.

An embodiment of the present invention will now be explained by use of FIG. 1. In the figure, reference numerals 1 and 40 denote magnetic tapes, numerals 2, 3, 41 and 42 magnetic heads, numerals 4 and 43 cylinders, numerals 5 and 44 capstans, numerals 10 and 50 servo control circuits, numerals 20, 31 and 60 demodulation circuits, numerals 21, 32 and 61 error correction circuits, numerals 22 and 23 compression circuits, numerals 24 and 33 parity addition circuits, numerals 25 and 34 modulation circuits, numerals 26 a transmission circuit, numeral 27 a transmission path, numeral 30 a reception circuit, numerals 62 and 63 expansion circuits, numerals 64 and 65 D/A conversion circuits, numeral 70 a video signal output terminal, and numeral 71 an audio signal output terminal.

Firstly, the operation of a transmission signal processing system will be explained. Digital video and audio signals recorded on the magnetic tape 1 are reproduced by the magnetic heads 2 and 3 mounted on the cylinder 4 and are inputted to the demodulation circuit 20. The magnetic tape 1 travels by virtue of the capstan 5. The travel speed of the magnetic tape 1 and the rotation frequency of the cylinder 4 are, for example, ten times as high as the tape travel speed and the cylinder rotation speed upon normal reproduction. Accordingly, the signal inputted to the demodulation circuit 20 is a signal time-compressed to one tenth. For example, a 120-minute signal recorded on the magnetic tape 1 can be reproduced in 12 minutes.

Generally, in the case where a digital signal is to be recorded on a magnetic recording medium, the signal is recorded after having been modulated into scrambled NRZ code, $M^2$ code or the like. The demodulation circuit 20 performs a demodulation processing, that is, a signal processing for restoring the thus modulated signal into original digital data. The signal demodulated by the demodulation circuit 20 is inputted to the error correction circuit 21 in which erroneous data produced in a magnetic recording/reproducing process is detected and the correction for the erroneous data is made. Further, the signal is separated into a video signal and an audio signal which are in turn inputted to the compression circuits 22 and 23, respectively. The video signal is bit-compressed through, for example, discrete cosine conversion. The audio signal is bit-compressed through, for example, non-linear quantization or differential PCM. As a result, the transmission rate of the video signal and the audio signal in total is reduced to, for example, one twentieth.

Output signals of the compression circuits 22 and 23 are inputted to the parity addition circuit 24 for performing a signal processing which includes adding a parity signal for error correction and outputting the video signal and the audio signal serially in accordance with a transmission format. A serial output signal of the parity addition circuit 24 is inputted to the modulation circuit 25. In the modulation circuit 25, the serial signal is modulated in accordance with the characteristic and the frequency band of the transmission path 27. For example, in the case where the signal is transmitted in an electric wave form, quadruple phase shift keying (QPSK) is made. The modulated signal is inputted to the transmission circuit 26 from which it is outputted to the transmission path 27.

As apparent from the foregoing explanation of the operation of the transmission signal processing system, it is possible to transmit a signal at a speed which is ten times as high as a normal speed.

The above embodiment has been shown in conjunction with the case where a signal from the VTR is reproduced. However, a signal source is not limited to the VTR and may include a magnetic disk device, an optical disk device or the like.

Next, explanation will be made of the operation of the VTR for receiving and recording the transmitted signal. The signal transmitted from the transmission signal processing system is received by the reception circuit 30. The received signal is inputted to the demodulation circuit 31. The demodulation circuit 31 is provided corresponding to the modulation and demodulates the signal to the original signal. The demodulated signal is inputted to the error correction circuit 32 in which the detection of and the correction for an error produced in the transmission path 27 are made on the basis of the parity signal added by the parity addition circuit 24. At this time, in the case where the S/N ratio of the transmission system is not sufficient so that complete correction for the error is impossible, correction is made through, for example, signal replacement, by use of the signal correlation.

An output signal of the error correction circuit 32 is inputted to the parity addition circuit 33. In the parity addition circuit 33, a parity signal for detecting an error produced in a recording/reproducing process and making correction for the error is added. The parity-added signal is inputted to the modulation circuit 34. In the modulation circuit 34, the signal is modulated to scrambled NRZ code, $M^2$ code or the like as mentioned above. The modulated signal is recorded on the magnetic tape 40 by the magnetic heads 41 and 42 mounted on the cylinder 43.

Since the signal supplied to the magnetic heads 41 and 42 is a signal which is time-base compressed to one tenth as compared with a signal upon normal operation, the servo control circuit 50 controls the cylinder 43 and the capstan 44 so that the rotation frequency of the cylinder 43 and the travel speed of the magnetic tape 40 become ten times as high as those upon normal recording. Also, in order to record a predetermined signal at a predetermined position on the magnetic, tape 40, synchronization information is detected from the received signal to control the phase of rotation of the cylinder 41 on the basis of the detected synchronization information.

Next, the operation of the VTR for reproducing the thus recorded signal will be explained. Upon reproduction, the travel speed of the magnetic tape 40 and the rotation frequency of the cylinder 43 are set to those upon normal reproduction. The reproduced signal is inputted to the demodulation circuit 60. The demodulation circuit 60 is provided corresponding to the modulation circuit 34 and demodulates the modulated signal. The demodulated signal is inputted to the error correction circuit 61 in which the detection of an error produced in the magnetic recording/reproducing system and the correction for the error are made on the basis of the parity signal added by the parity addition circuit 33. In the case where there is an error which cannot be corrected, the error is properly corrected by use of the signal correlation. Also, the signal is outputted after having been separated into a video signal and an audio signal.

The video signal is inputted to the expansion circuit 62. The expansion circuit 62 is provided corresponding to the compression circuit 22 and restores the compressed video signal into the original video signal. An output signal of the expansion circuit 62 is inputted to the D/A conversion circuit 64 and is converted thereby into an analog video signal which is in turn outputted from the terminal 70.

The audio signal is inputted to the expansion circuit 63. The expansion circuit 63 is provided corresponding to the compression circuit 23 and restores the compressed audio signal into the original audio signal. An output signal of the expansion circuit 63 is inputted to the D/A conversion circuit 65 and is converted thereby into an analog audio signal which is in turn outputted from the terminal 71.

In the foregoing, the embodiment of the present invention has been shown and the operation thereof has been explained. According to the present invention, a video signal and an audio signal over a long time can be transmitted and recorded in a short time, thereby making it possible to extend the range of use of the digital VTR.

Figure 2:
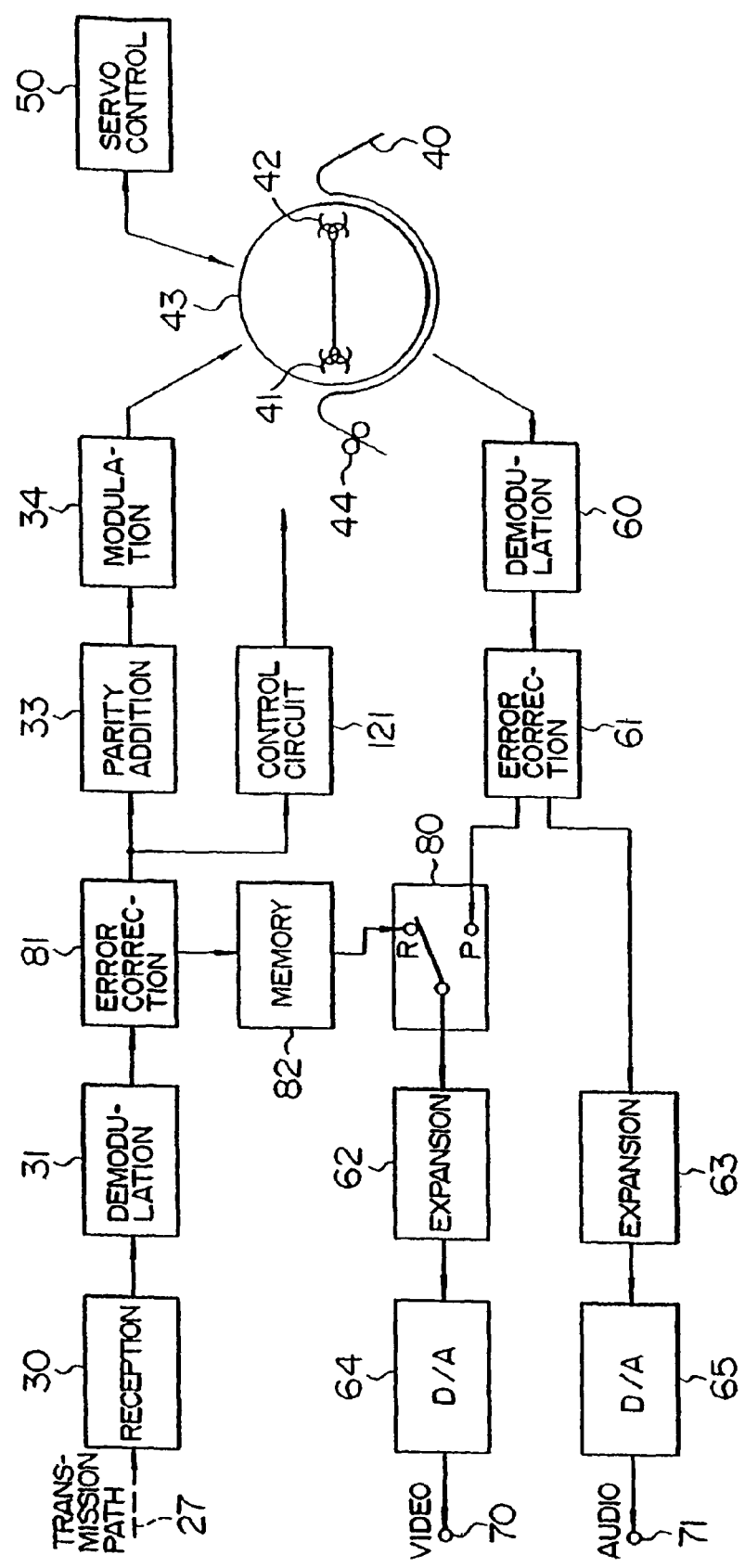
FIG. 2 is a block diagram of a recording/reproducing system according to another embodiment of the present invention.

Another embodiment of the present invention is shown in FIG. 2. FIG. 2 is partially similar to FIG. 1. The same parts in FIG. 2 as those in FIG. 1 are denoted by the same reference numerals as those used in FIG. 1 and detailed explanation thereof will be omitted. The embodiment shown in FIG. 2 concerns a VTR in which a signal transmitted/received at a high speed can be recorded while being monitored.

In FIG. 2, reference numeral 80 denotes a change-over switch, numeral 81 an error correction circuit, and numeral 82 a memory circuit. An error corrected video signal outputted from the error correction circuit 81 is inputted through the memory circuit 82 to a terminal R side of the change over switch 80 which is selected upon recording. The memory circuit 82 has a memory capacity for at least one field. The video signal received at a high speed is stored into a memory of the memory circuit 82 with the number of frames being reduced. The stored signal is read from the memory at a normal speed and is inputted to an expansion circuit 62.

Upon reproduction, a video signal output of an error correction circuit 61 is inputted to a terminal P side of the change-over switch 80 which is selected upon reproduction. Accordingly, the operation of the embodiment of FIG. 2 upon reproduction is similar to that of the embodiment shown in FIG. 1.

In the embodiment shown in FIG. 2, upon recording, the video signal outputted from the error correction circuit 81 is inputted to the expansion circuit 62 through the memory circuit 82. Alternatively, an output signal of a modulation circuit 34 may be inputted to a demodulation circuit 60 through a memory circuit. Also, in the case where the operating speed of the demodulation circuit 60 or the error correction circuit 61 leaves a margin, a memory circuit may be properly placed at a post stage. Or, in the case where the storage capacity of the error correction circuit 61 or the expansion circuit 62 leaves a margin, the circuit may be used as a memory circuit or any additional memory circuit may be omitted.

As has been explained in the above, the embodiment shown in FIG. 2 makes it possible to record a received video signal while monitoring it in the form of a picture having a reduced number of frames.

Figure 3:
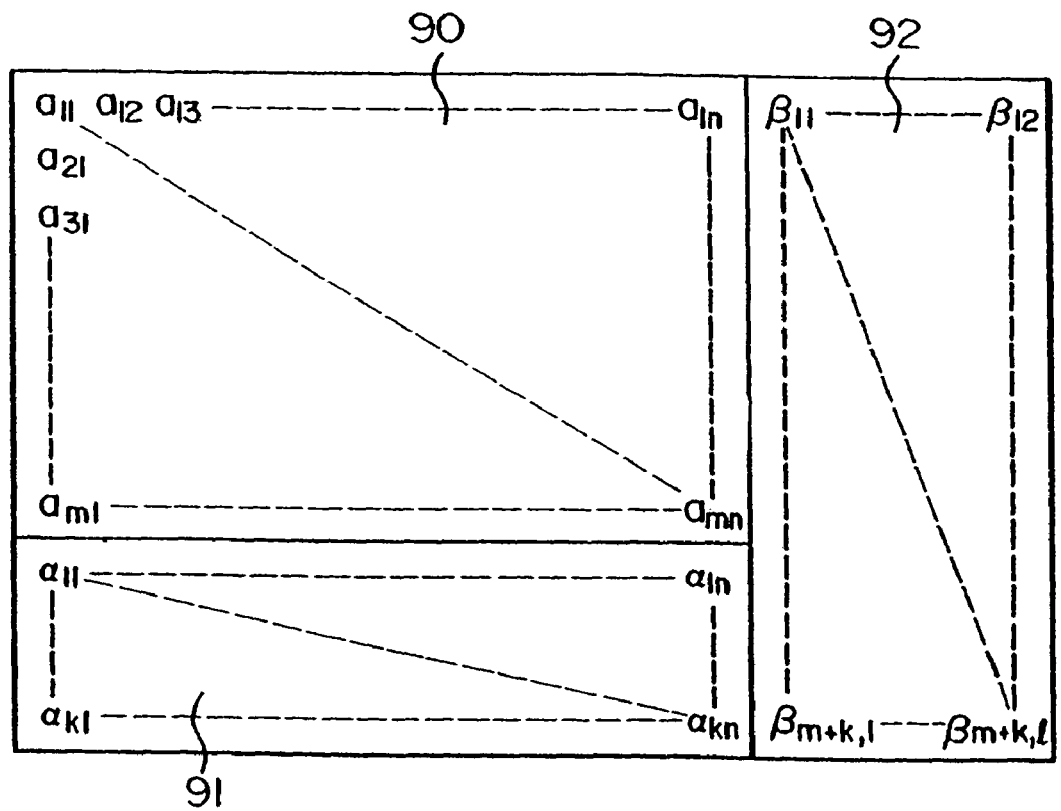
FIG. 3 is a diagram for explaining the conventional parity adding method.

In the embodiment shown in FIG. 1, the parity signal is added in order to make the detection of and the correction for an error which may be produced in the transmission system or the magnetic recording/reproducing system. One example of a parity adding method is shown in FIG. 3 in conjunction with the case of a D2 format VTR. In the D2 format VTR, a signal for one field is divided into a plurality of segments for signal processing. FIG. 3 shows one segment. In FIG. 3, reference numeral 90 represents a group of video data, numeral 91 a group of outer code parities, and numeral 92 a group of inner code parities. Firstly, outer code parities are added for data of the matrix-like arranged video data group 90 which lie in a vertical direction in FIG. 3. Thereafter, inner code parities are added for data of the video data group 90 and the outer code parity group 91 lying in a horizontal direction in FIG. 3, thereby producing a signal to be recorded. Though detailed explanation of the generation of parities will be omitted herein, the parities are generated in accordance with a generating function $G(x)$.

In the embodiment shown in FIG. 1, if the same parity generation manner is employed by the parity addition circuits 24 and 33, the error correction circuits 32 and 61 may hold the most part thereof in common. Namely, since the error correction circuits 32 and 61 are circuits which are respectively used upon recording and upon reproduction, it is possible to reduce the circuit scale or size by using the most part of the circuits 32 and 61 in common.

Figure 4:
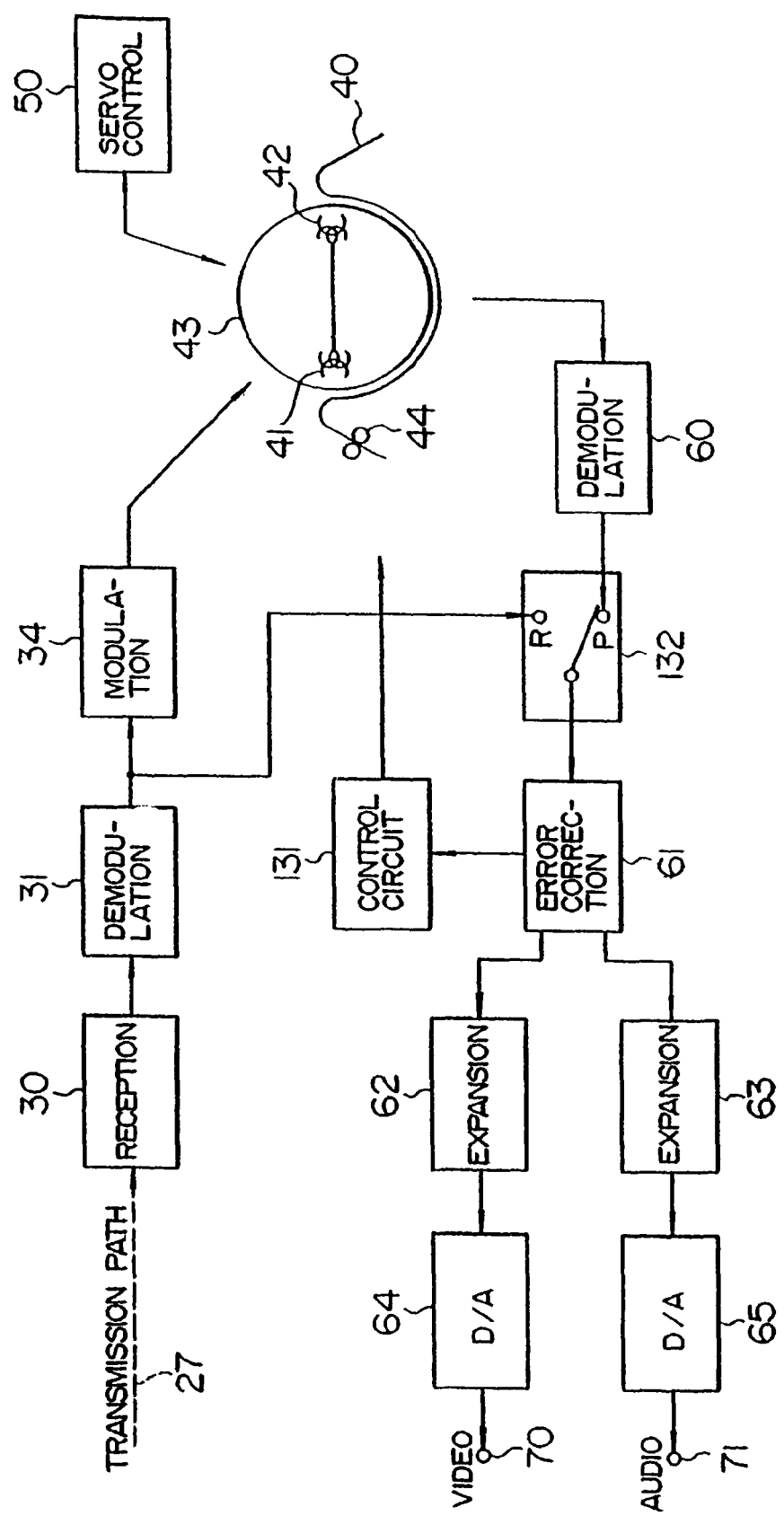
FIG. 4 is a block diagram of a recording/reproducing system according to still another embodiment of the present invention.

Further, in the case where the same parity generation manner is employed by the parity addition circuits 24 and 33 in the embodiment shown in FIG. 1, it is possible to further reduce the circuit scale or size of the recording/reproducing system. The construction in that case is shown in FIG. 4 as still another embodiment of the present invention. FIG. 4 is partially common to FIG. 1 or 2. The parts in FIG. 4 common to those in FIG. 1 or 2 are denoted by the same reference numerals as those used in FIG. 1 or 2 and detailed explanation thereof will be omitted.

The embodiment shown in FIG. 4 is based on a concept that an error produced in a transmission system and an error produced in a magnetic recording/reproducing system are simultaneously detected and corrected by an error correction circuit 61. Accordingly, a signal received by a reception circuit 30 is demodulated by a demodulation circuit 31 and is inputted to a modulation circuit 34 without being subjected to error correction and parity addition. The subsequent processing is the same as that in the embodiment shown in FIG. 1 or 2. Namely, a reproduced signal is inputted to the error correction circuit 61 after demodulation by a demodulation circuit 60. As mentioned above, an error produced in the transmission system and an error produced in the magnetic recording/reproducing system are simultaneously detected and corrected by the error correction circuit 61 in the reproducing system.

In the embodiment shown in FIG. 4, the error correction circuit 32 and the parity addition circuit 33 can be removed as compared with the embodiment shown in FIG. 1 or 2, thereby making it possible to reduce the circuit scale.

Though having not been mentioned in the foregoing embodiments, in a helical scan VTR as shown, since a signal becomes discontinuous when a track jump is made upon reproduction, the recording is made with an amble signal being added to the heading portion of a signal. Since the addition of an amble signal is employed in the D2 format VTR, detailed explanation thereof will be omitted. Also, in order to define a starting position of a signal, a synchronizing signal is properly added. Since the addition of a synchronizing signal is known in, for example, the D2 format VTR, detailed explanation thereof will be omitted.

In the embodiment shown in FIG. 1, the addition of an amble signal may be made by the parity addition circuit 24. Alternatively, it may be made on the recording/reproducing system side in order to enhance the efficiency of use of the transmission path 27. In this case, the addition of an amble signal can be made by the parity addition circuit 33. As for the embodiment shown in FIG. 4, in the case where the addition of an amble signal is to be made on the recording/reproducing system side, the amble signal can be added by the modulation circuit 34. In the case where the addition of an amble signal is made on the recording/reproducing system side, it is possible to enhance the efficiency of use of the transmission path 27. On the other hand, in the case where the addition of an amble signal is made on the transmission signal processing system side, the lowering of the cost of a VTR can be attained as a great effect when a signal is sent to a multiplicity of VTR's simultaneously.

Figure 5:
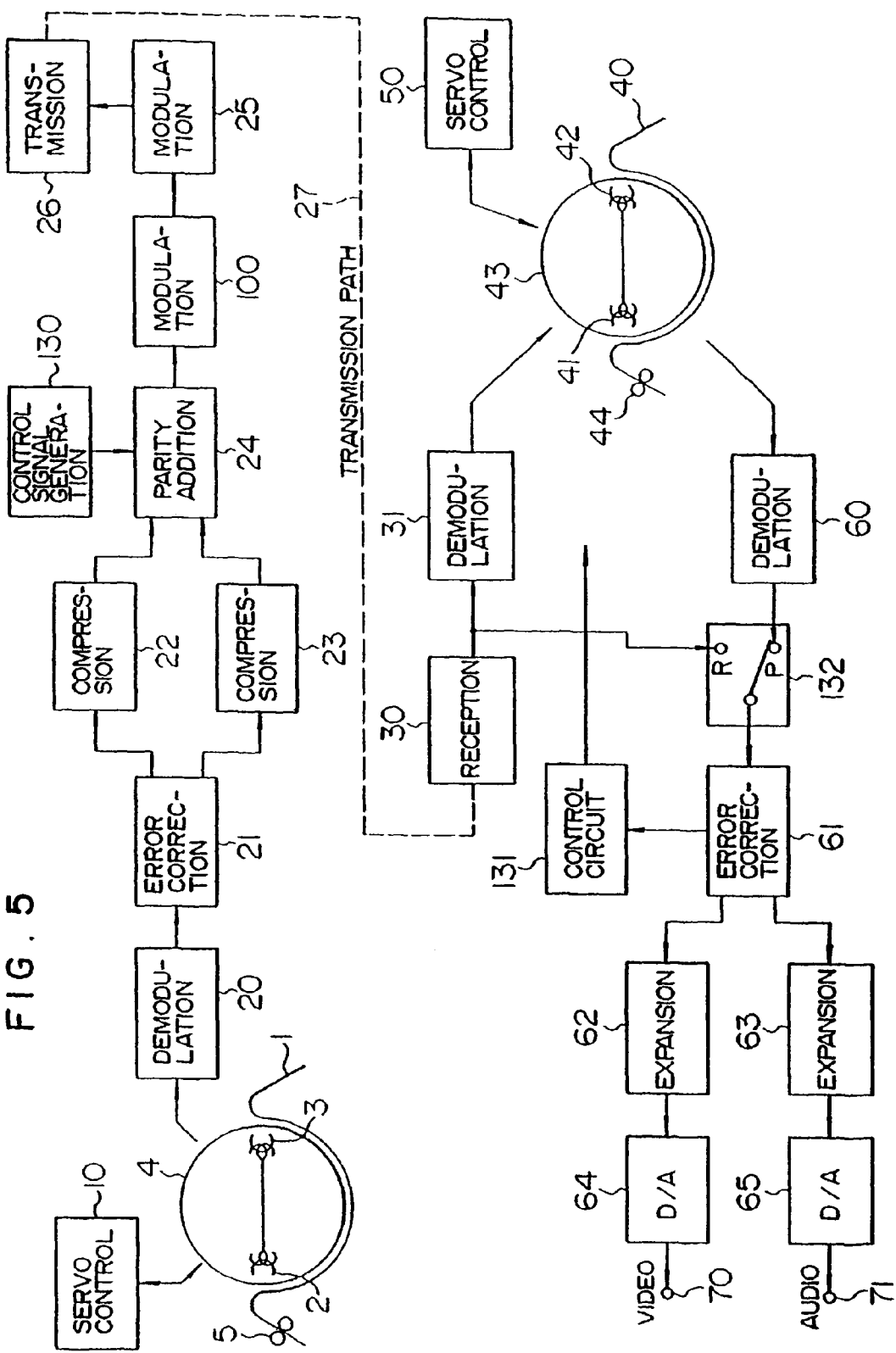
FIG. 5 is a block diagram of a digital transmission signal processing system and a recording/reproducing system according to a further embodiment of the present invention.

FIG. 5 shows a further embodiment of the present invention in which the further reduction of the circuit scale of a VTR on the receiving side and hence the further lowering of the cost can be attained in the case where a signal is sent to a multiplicity of VTR's simultaneously.

FIG. 5 is partially common to FIG. 1, 2 or 4. The parts in FIG. 5 common to those in FIG. 1, 2 or 4 are denoted by the same reference numerals as those used in FIG. 1, 2 or 4 and detailed explanation thereof will be omitted. In FIG. 5, reference numeral 100 denotes a modulation circuit. The embodiment shown in FIG. 5 is based on a concept that a signal processing required upon a recording mode of a VTR is performed on the transmitting side. Namely, modulation adapted for magnetic recording/reproduction, for example, a signal processing corresponding to the modulation circuit 34 shown in FIG. 4 is performed on the transmission signal processing system side. After parities have been added by a parity addition circuit 24 of the transmission signal processing system, the modulation adapted for the magnetic recording/reproduction is performed by the modulation circuit 100. Therefore, modulation adapted for transmission is performed by a modulation circuit 25. As a modulation system employed by the modulation circuit 100 is suitable a system which does not cause the extension of a frequency band by modulation, for example, scrambled NRZ. A signal modulated by the modulation circuit 25 is transmitted to a transmission path 27 through a transmission circuit 26 in a manner to that in the embodiment shown in FIG. 1.

The signal received by a reception circuit 30 through the transmission path 27 is inputted to a demodulation circuit 31 in which the signal is subjected to demodulation corresponding to the modulation circuit 25. Since the signal demodulated by the demodulation circuit 31 is one which has already been subjected by the modulation circuit 10 to the modulation adapted for the magnetic recording/reproduction, the signal is recorded on a magnetic tape 40 by magnetic heads 41 and 42 as it is. As a result, the same recording as that in the embodiment shown in FIG. 4 is made. An operation upon reproduction is similar to that in the embodiment shown in FIG. 4.

As apparent from the above, the present embodiment makes it possible to remarkably reduce the circuit scale of the VTR.

According to one of applications of the present invention, it is possible to transmit a signal from a transmission signal processing system to a multiplicity of VTR's through a transmission path simultaneously and at a high speed, as has already been mentioned. In this case, it is difficult to control a multiplicity of 'VTR's simultaneously. Further, it is required to make a control which causes specified ones of the VTR's to perform recording operations and specified others of the VTR's not to perform recording operations. A technique for realizing such a control will be shown just below.

Figure 6:
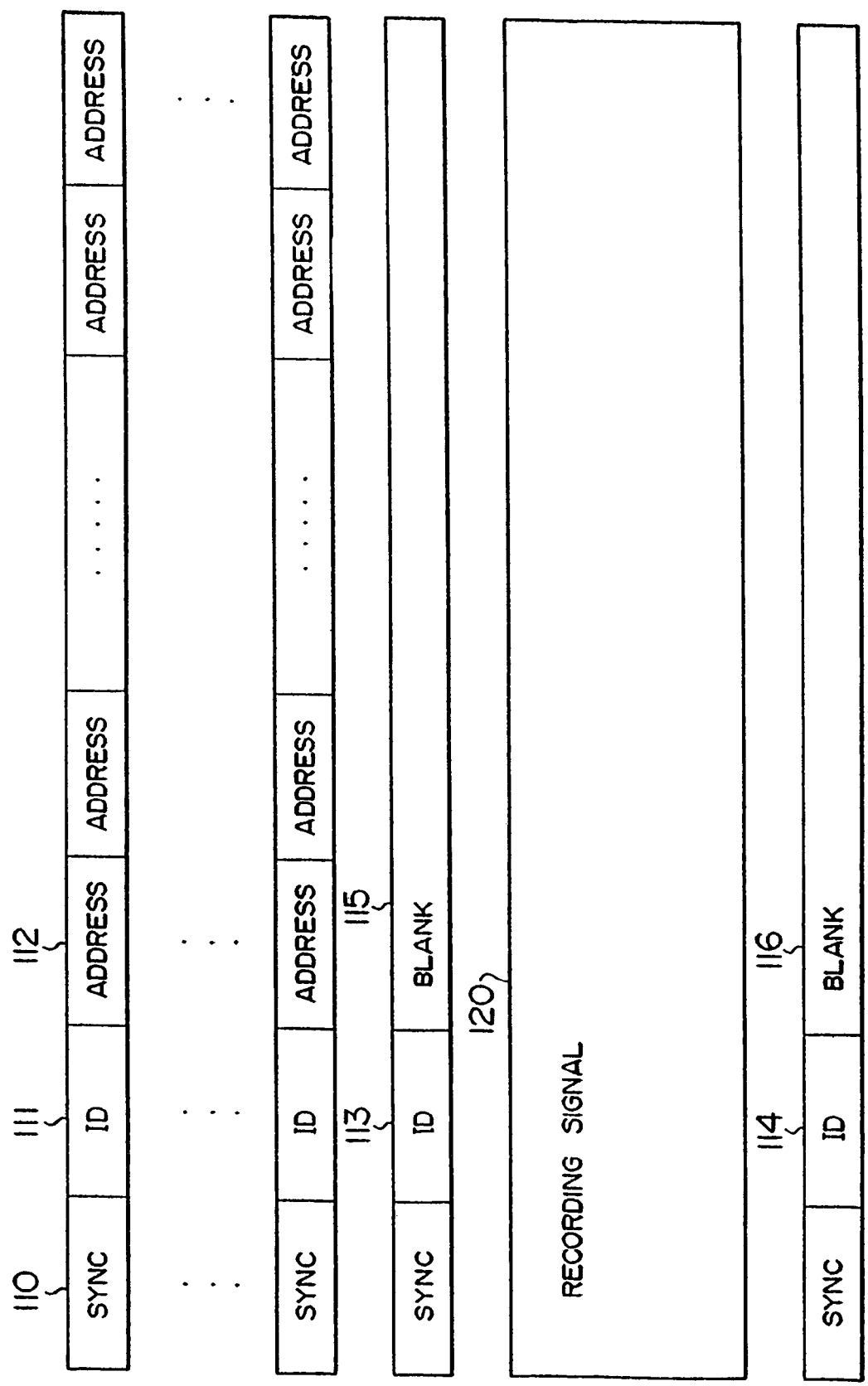
FIG. 6 shows the format of control signals used in one of applications of the present invention.

For the above purpose, control signals are transmitted prior to transmission of a signal to be recorded. One example of the control signals is shown in FIG. 6. In the figure, reference numeral 110 denotes a synchronizing signal, numeral 111 an ID signal indicative of a control to be made, numeral 112 an address signal indicative of a VTR to be controlled, numeral 113 a control signal for bringing a VTR designated by the address signal 112 into a recording mode, numeral 114 a control signal for stopping the recording, numerals 115 and 116 blank signals, and numeral 120 a recording signal to be actually recorded.

The ID signal 111 indicating the transmission of the address signals 112 indicative of VTR's in which a signal is to be recorded, is transmitted at a predetermined position relative to the synchronizing signal 110 to bring each VTR into a standby condition. After all the address signals have been transmitted, the ID signal 113 is transmitted to start the recording of the signal 120 in the designated VTR's. After the signal 120 has been transmitted, the ID signal 114 to control the stop of recording is transmitted. Each of the blank signals 115 and 116 is a signal for conforming a signal transmission format to the other transmission signal and is therefore an insignificant signal portion.

In the embodiments shown in FIGS. 1 and 5, those control signals are produced by a control signal generation circuit 130 and are transmitted with parities which are added by the parity addition circuit 24 for making correction for an error produced during transmission.

In the VTR shown in FIG. 1, the control signals are detected by a control circuit 131 after the reception by the reception circuit 30, the demodulation by the demodulation circuit 31 and the correction by the error correction circuit 32 for an error produced during transmission to make a control for the recording and the stop of recording in the recording/reproducing system.

In the case of the VTR's shown in FIGS. 4 and 5, an output signal of the demodulation circuit 31 is inputted to the error correction circuit 61 for a need of making correction for an error produced during transmission and error-corrected control signals are inputted to a control circuit 131. In a change-over circuit 132, the terminal R side for selecting an output signal of the demodulation circuit 31 is selected upon recording and the terminal P side for selecting an output signal of the demodulation circuit 60 is selected upon reproduction.

As apparent from the foregoing, the present embodiment makes it possible to control a multiplicity of VTR's selectively and simultaneously.

Also, the use of the change-over circuit 132 and a memory circuit makes it possible to record a signal while monitoring it in the form of a picture having a reduced number of frames, as explained in conjunction with the embodiment shown in FIG. 2.

Next, a still further embodiment of the present invention will be explained by use of FIG. 7. In the figure, reference numeral 301 denotes an input terminal for standard analog video signal, numeral 302 an input terminal for standard digital video signal, numeral 303 an input terminal for high-speed digital video signal, numeral 305 a recording system mode change-over switch, numeral 306 a recording system change-over signal generation circuit, numeral 310 an A/D converter, numeral 320 a change-over circuit, numeral 330 a data compression circuit, numeral 340 a change-over circuit, numeral 350 a recording system signal processing circuit for performing a signal processing which includes addition of error correction code and modulation for recording, numeral 370 a cylinder, numeral 371 a magnetic tape, numerals 372 and 372' magnetic heads, numeral 380 a reproducing system signal processing circuit for performing a signal processing which includes demodulation for reproduction, error detection and error correction. Numeral 390 a change-over circuit, numeral 400 a data expansion circuit, numeral 420 a D/A converter, numeral 431 an output terminal for standard analog video signal, numeral 432 an output terminal for standard digital video signal, numeral 433 an output terminal for high-speed digital video signal, numeral 435 a reproducing system mode change-over switch, and numeral 436 a reproducing system change-over signal generation circuit.

The present embodiment is an example of a digital magnetic recording/reproducing system which has recording modes of standard-speed recording and high-speed recording and reproduction modes of standard-speed reproduction and high-speed reproduction. FIG. 8 shows one example of the specification of input video signals.

Firstly, explanation will be made of standard-speed recording. A digital signal into which an analog video signal inputted from the input terminal 301 is converted by the A/D converter 310 or an equivalent digital signal which is inputted from the input terminal 302, is switched or selected by the change-over circuit 320, is subjected to a predetermined data compression processing by the data compression circuit 330 and is thereafter inputted to a terminal 340a of the changeover circuit 340. In the change-over circuit 340, a change-over to connect the terminal 340a and a terminal 340c is made by a change-over signal from the recording system change-over signal generation circuit 306. Thereby, the data-compressed signal is inputted to the recording system signal processing circuit 350. In the recording system signal processing circuit 350, a signal processing such as channel division, addition of error correction code and modulation for recording is performed at a predetermined processing clock adapted for the data-compressed signal. Thereafter, the signal is supplied to the magnetic heads 372 and 372' mounted on the cylinder 370 so that it is recorded onto the magnetic tape 371. The cylinder 370 and the magnetic tape 371 are controlled by a servo control circuit 360. The servo control circuit 360 controls a cylinder motor and a capstan motor so as to provide a cylinder rotation speed and a tape speed for standard speed and so as to be synchronized with the input video signal.

Next, explanation will be made of high-speed recording. A high-speed digital video signal inputted from the input terminal 303 is sent to a terminal 340b of the change-over circuit 340. Since the high-speed digital video signal is a signal which has already been subjected to a data compression processing, it is not necessary to pass the signal through the data compression circuit 330. A change-over to connect the terminal 340b and the terminal 340c is made by a change-over signal from the recording system change-over signal generation circuit 306 so that the high-speed digital video signal is inputted to the recording system signal processing circuit 350. In the recording system signal processing circuit 350, a signal processing similar to that in the case of the standard-speed recording is performed at a predetermined processing clock adapted for the high-speed digital video signal. Thereafter, the signal is supplied to the magnetic heads 372 and 372' mounted on the cylinder 370 so that it is recorded onto the magnetic tape 371. The cylinder 370 and the magnetic tape 371 are controlled by the servo control circuit 360. The servo control circuit 360 control the cylinder motor and the capstan motor so as to provide a predetermined cylinder rotation speed and a predetermined tape speed and so as to be synchronized with the input video signal.

In the present invention, the recording onto the tape can be made with the quite same format in both the standard-speed recording and the high-speed recording, thereby making it possible to greatly shorten a recording time in the high-speed recording mode.

Next, explanation will be made of a signal processing upon reproduction. In the present embodiment, the recording pattern on the magnetic tape is the same whichever of the standard-speed recording and the high-speed recording is selected as a recording mode. Therefore, either standard-speed reproduction or high-speed reproduction can be selected irrespective of the recording mode.

Firstly, the standard-speed reproduction will be explained. The servo control circuit 360 controls the cylinder motor and the capstan motor so that a cylinder rotation speed and a tape speed for standard speed are provided. A signal reproduced by the magnetic heads 372 and 372' is inputted to the reproducing system signal processing circuit 380. In the reproducing system signal processing circuit 380, a signal processing such as demodulation for reproduction, channel synthesis, error detection and error correction is performed at a predetermined processing clock adapted for the standard-speed reproduction. Thereafter, the signal is supplied to a terminal 390a of the change-over circuit 390. In the change-over circuit 390, a changeover to connect the terminal 390a and a terminal 390c is made upon standard-speed reproduction by a change-over signal from the reproducing system change-over signal generation circuit 436. Thereby, the reproduced signal is supplied to the data expansion circuit 400. In the data expansion circuit 400, a signal processing reverse to the data compression processing upon recording is performed so that the signal is restored to the original signal. Thereby, the original transmission rate is restored. The data-expanded reproduction signal is sent to the D/A converter 420 on one hand to be outputted as an analog video signal from the output terminal 431 after D/A conversion and is sent to the output terminal 432 on the other hand to be outputted as a digital video signal therefrom.

Next, explanation will be made of the high-speed reproduction. The servo control circuit 360 controls the cylinder motor and the capstan motor so that a predetermined cylinder rotation speed and a predetermined tape speed adapted for the high-speed reproduction are provided. A signal reproduced by the magnetic heads 372 and 372' is inputted to the reproducing system signal processing circuit 380. In the reproducing system signal processing circuit 380, a signal processing such as demodulation for reproduction, channel synthesis, error detection and error correction is performed at a predetermined processing clocks adapted for the high-speed reproduction. Thereafter, the high-speed reproduction signal is supplied to the terminal 390a of the change-over circuit 390. In the change-over circuit 390, a change-over to connect the terminal 390a and a terminal 390b is made upon high-speed reproduction. Thereby, the high-speed digital video signal is outputted from the output terminal 433.

A furthermore embodiment of the present invention will be explained by use of FIG. 9. The construction of the present embodiment is similar to that of the embodiment shown in FIG. 7 but is different therefrom in that the change-over circuit 340 is placed at a different position, the change-over circuit 390 used in FIG. 7 is eliminated and a change-over circuit 345 is newly added.

Figure 7:
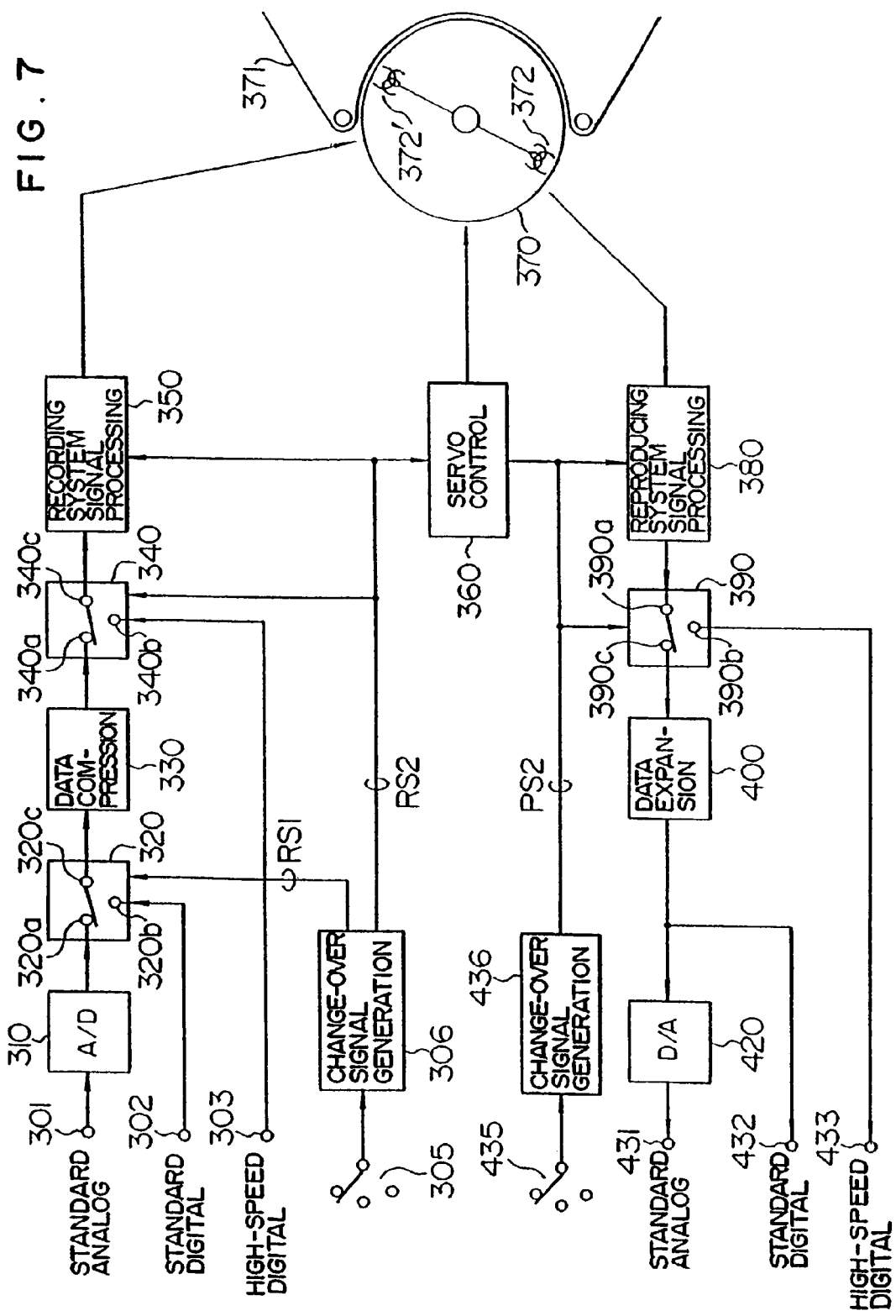
FIG. 7 is a block diagram of a still further embodiment of the present invention.

An input/output signal upon standard-speed recording/reproduction in the present embodiment is the same as that in the embodiment shown in FIG. 7. As for high-speed recording and high-speed reproduction, however, the present embodiment is different from the embodiment of FIG. 7 in that the transmission of a high-speed digital video signal is made in the form of a recording format. Accordingly, upon high-speed recording, the high-speed digital video signal is not passed through a recording system signal processing circuit 350 but is recorded onto a tape through the change-over circuit 340 as it is. Upon high-speed reproduction, a reproduced signal is subjected to a signal processing for reproduction such as error detection and error correction by a reproducing system signal processing circuit 380 and is thereafter inputted to a terminal 345b of the change-over circuit 345. The signal supplied through the change-over circuit 345 to the recording system side signal processing circuit 350 is subjected to a signal processing for recording such as addition of error correction code and modulation for recording by the signal processing circuit 350 to form a recording format and is thereafter outputted as a high-speed digital video signal from an output terminal 433.

Figure 9:
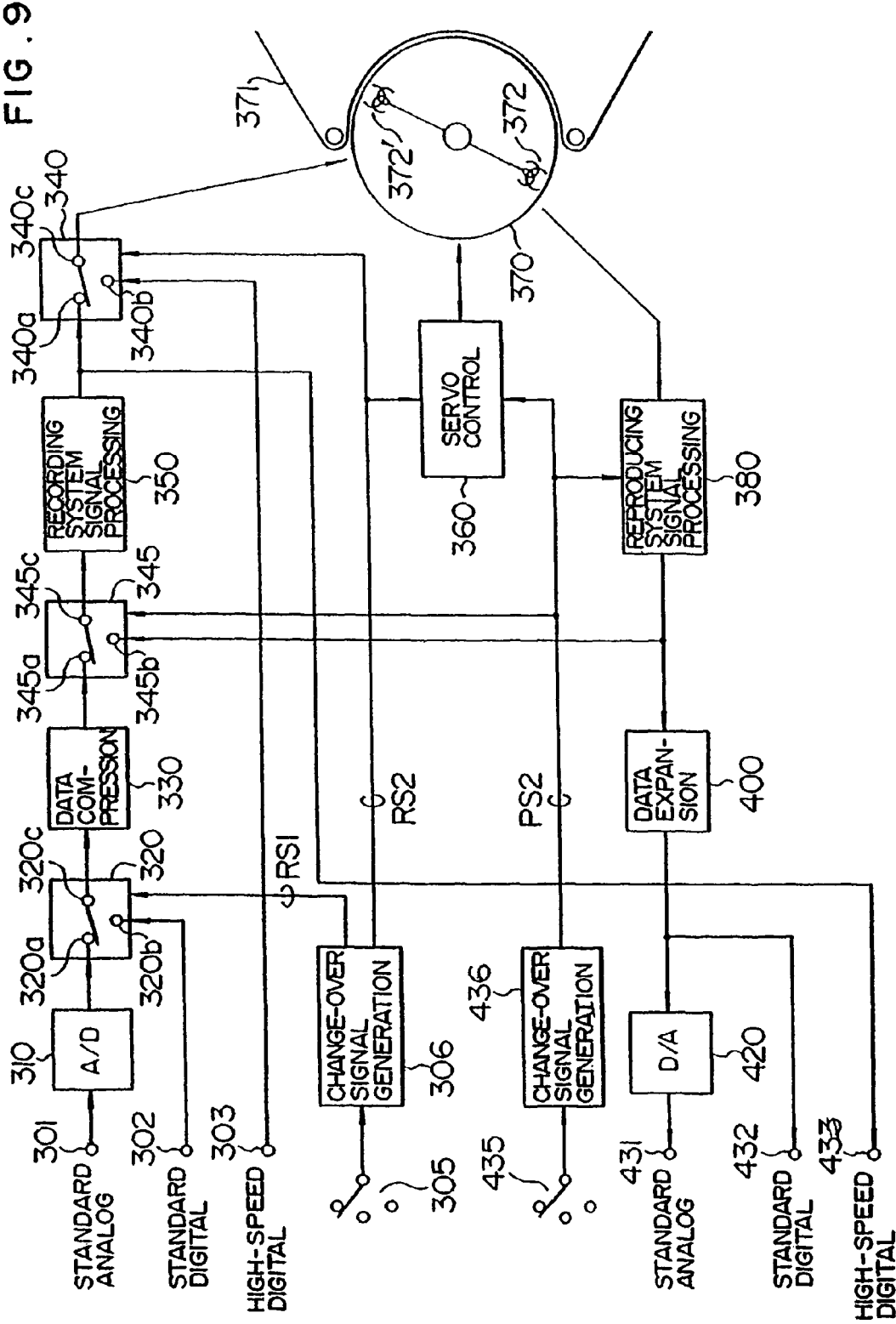
FIG. 9 is a block diagram of a furthermore embodiment of the present invention.
Figure 10:
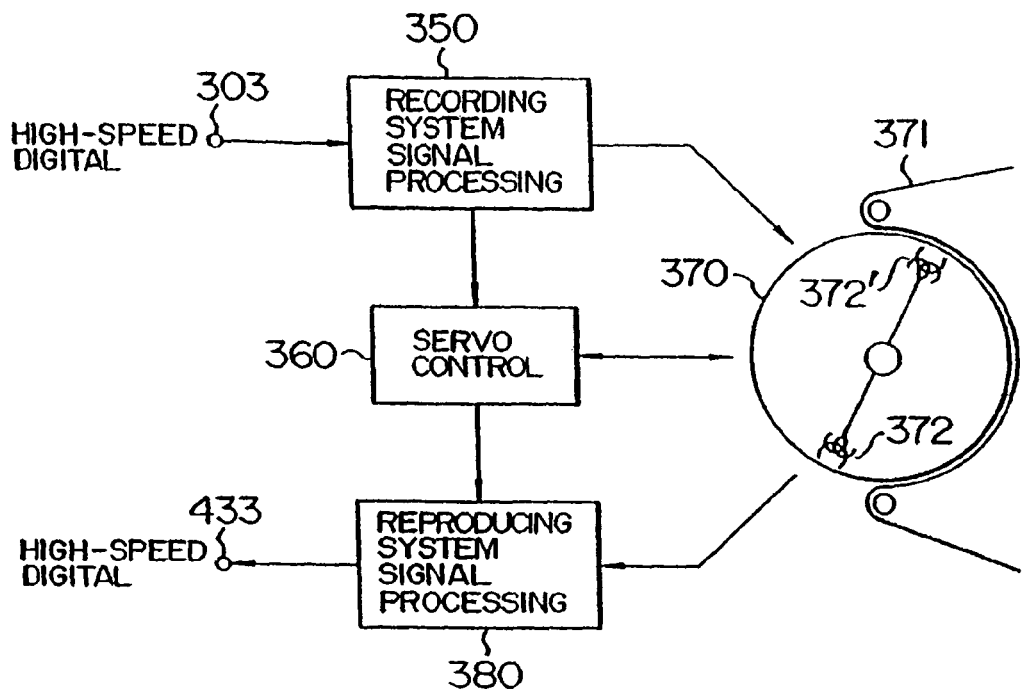
FIGS. 10, 11 and 12 are block diagrams of different examples of applications of the present invention.
Figure 11:
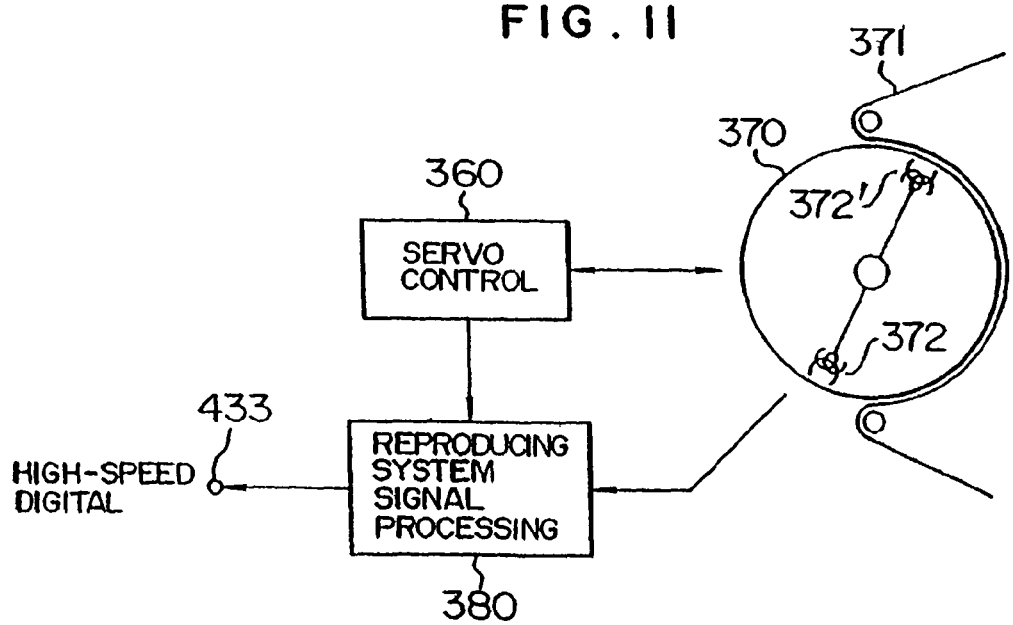
Figure 12:
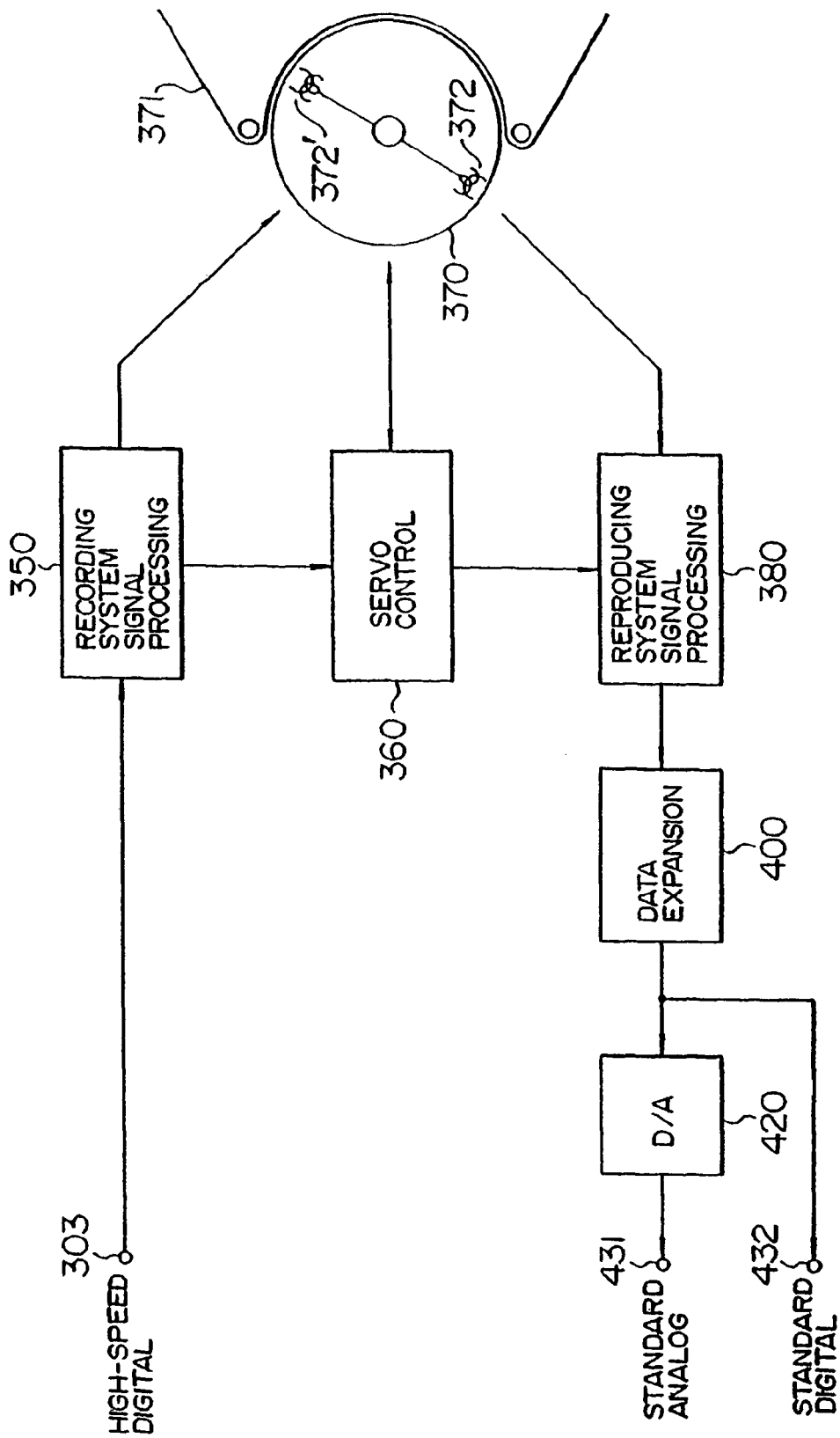

The embodiments shown in FIGS. 7 and 9 have feature that high-speed recording and high-speed reproduction are possible. The best use of this feature can be made for dubbing or data communication with the result of effective shortening of a dubbing time, a data communication time or a data circuit line occupation time. Also, though those embodiments have been mentioned in conjunction with an example in which all of standard-speed recording, high-speed recording, standard-speed reproduction and high-speed reproduction modes are involved, it is not necessarily required to implement all of those modes. There may be considered an example in which only a necessary mode is provided in compliance with the purpose of use. FIG. 10 shows an embodiment in which a high-speed recording function is provided as a recording mode and at least a high-speed reproduction function is provided as a reproduction mode. Also, there may be considered an embodiment as a system for the exclusive use for reproduction in which at least a high-speed reproduction function is provided, as shown in FIG. 11. Further, FIG. 12 shows an embodiment in which a high-speed recording function is provided as a recording mode and a standard-speed reproduction function is provided as a reproduction mode.

Figure 13:
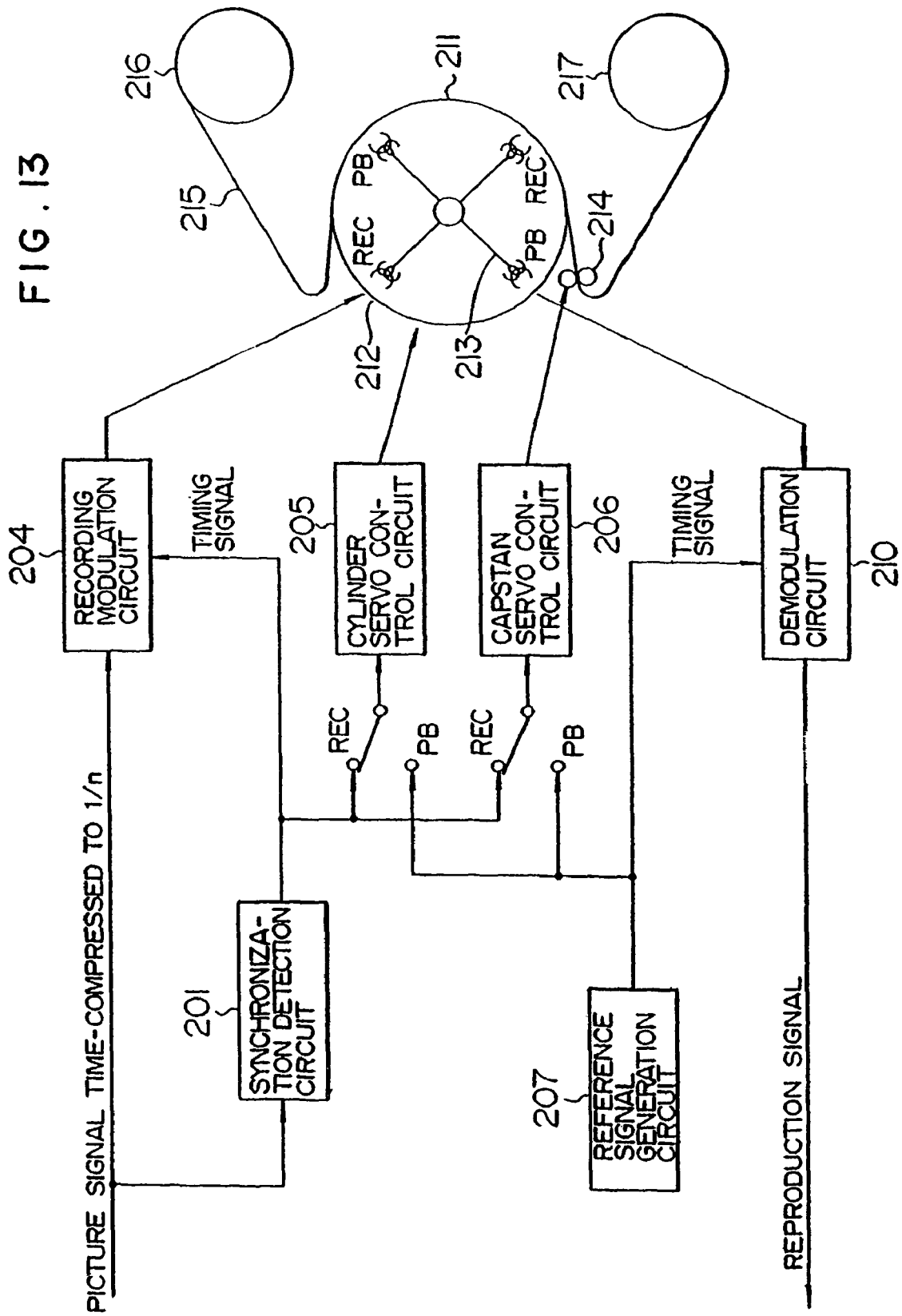
FIG. 13 is a block diagram for explaining one example of the operation of the embodiment shown in FIG. 7.
Figure 14:
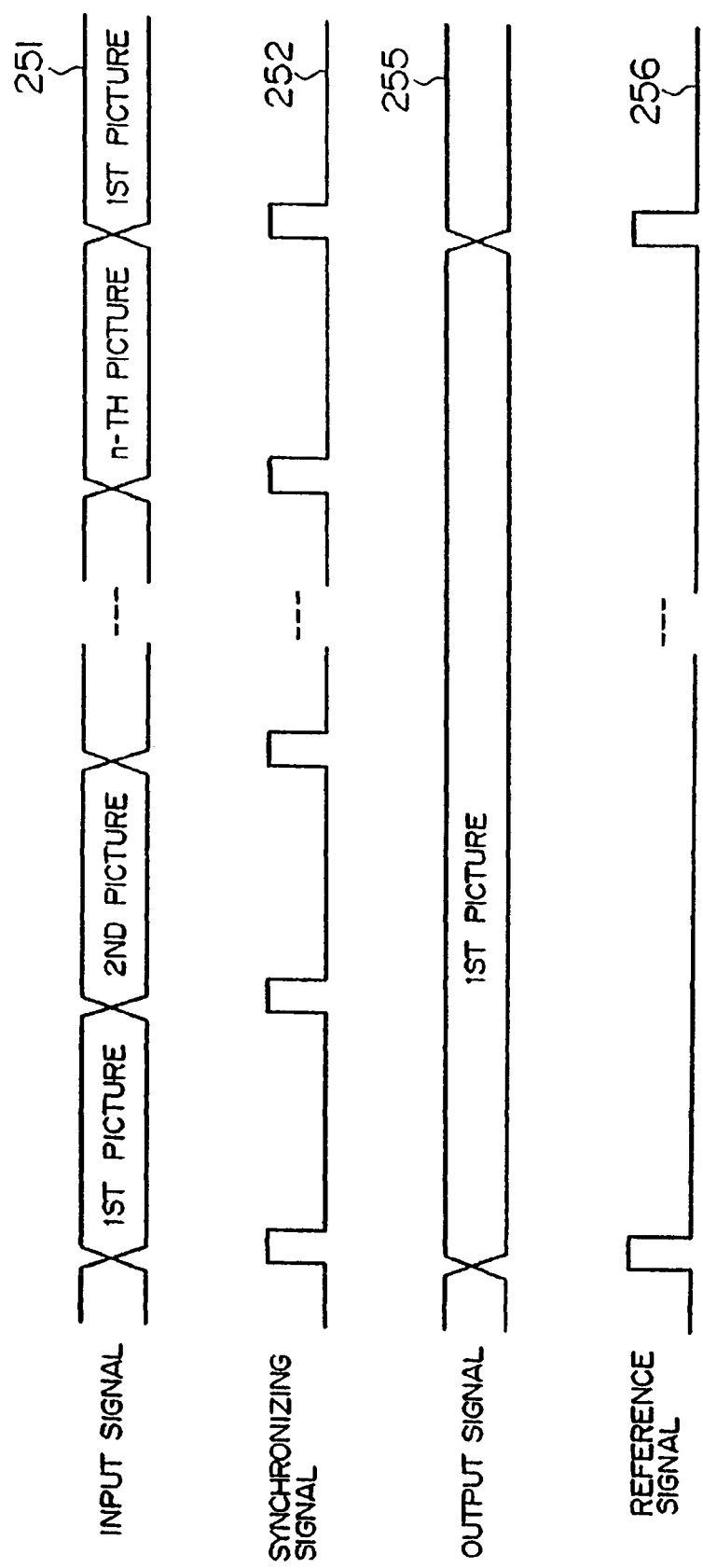
FIG. 14 is a timing chart showing the waveforms of signals involved in the example shown in FIG. 13.

FIG. 13 is a block diagram of one example of the magnetic recording/reproducing system of the embodiment of FIG. 7 for explaining processings subsequent to the compression processing. In FIG. 13, reference numeral 201 denotes a synchronization detection circuit, numeral 204 a recording modulation circuit, numeral 205 a cylinder servo control circuit, numeral 206 a capstan servo (or tape speed) control circuit, numeral 207 a reproduction reference signal generation circuit, numeral 210 a demodulation circuit, numeral 211 a cylinder, numeral 212 a pair of recording heads, numeral 213 a pair of reproducing heads, numeral 214 a capstan which controls the tape speed, numeral 215 a magnetic tape, numeral 216 a delivery reel, and numeral 217 a take-up reel. FIG. 14 is a timing chart of input and output signals in the example shown in FIG. 13 and schematically illustrate a compressed picture signal 251 which is an input signal, a synchronizing signal 252 of the picture signal, a standard-speed reproduction signal 255 which is an output signal, and a reproduction synchronizing signal 256.

In the shown example, n-tuple speed recording is realized by making a tape speed and a cylinder rotation speed upon recording n times as high as those upon standard-speed reproduction. As shown in FIG. 14, the compressed video signal as an input signal of the circuit shown in FIG. 13 and the synchronizing signal include information 251 for n pictures and n synchronizing pulses 252 synchronous therewith in a time when one picture is reproduced at a standard speed. The picture information is converted into a predetermined recording format by the recording modulation circuit 204 and is recorded onto the magnetic tape 215 by the recording heads 212. At this time, a synchronizing signal for the cylinder servo control circuit 205 and the capstan-servo control circuit 206 is increased by n times in compliance with the n-tuple speed video signal, as shown by 252 in FIG. 14, so that the rotation speed of the cylinder 211 and the feed speed of the magnetic tape 215 are increased by n times. Thereby, the recording onto the tape can be made with the quite same recording format as that in the case of the standard-speed recording. Upon reproduction, a synchronizing signal for the cylinder servo control circuit 205 and the capstan servo control circuit 206 is supplied from the reproduction reference signal generation circuit 207 to restore the cylinder rotation speed and the tape feed speed to those upon standard-speed reproduction, and a signal read by the reproducing heads 213 is demodulated by the demodulation circuit 210 and is outputted therefrom. In the circuit shown in FIG. 13, if the input video signal and the synchronizing signal are ones of standard speed, standard-speed recording is possible. Also, n-tuple speed reproduction is possible if the frequency of an output signal from the reproduction reference signal generation circuit is increased by n times.

Figure 15:
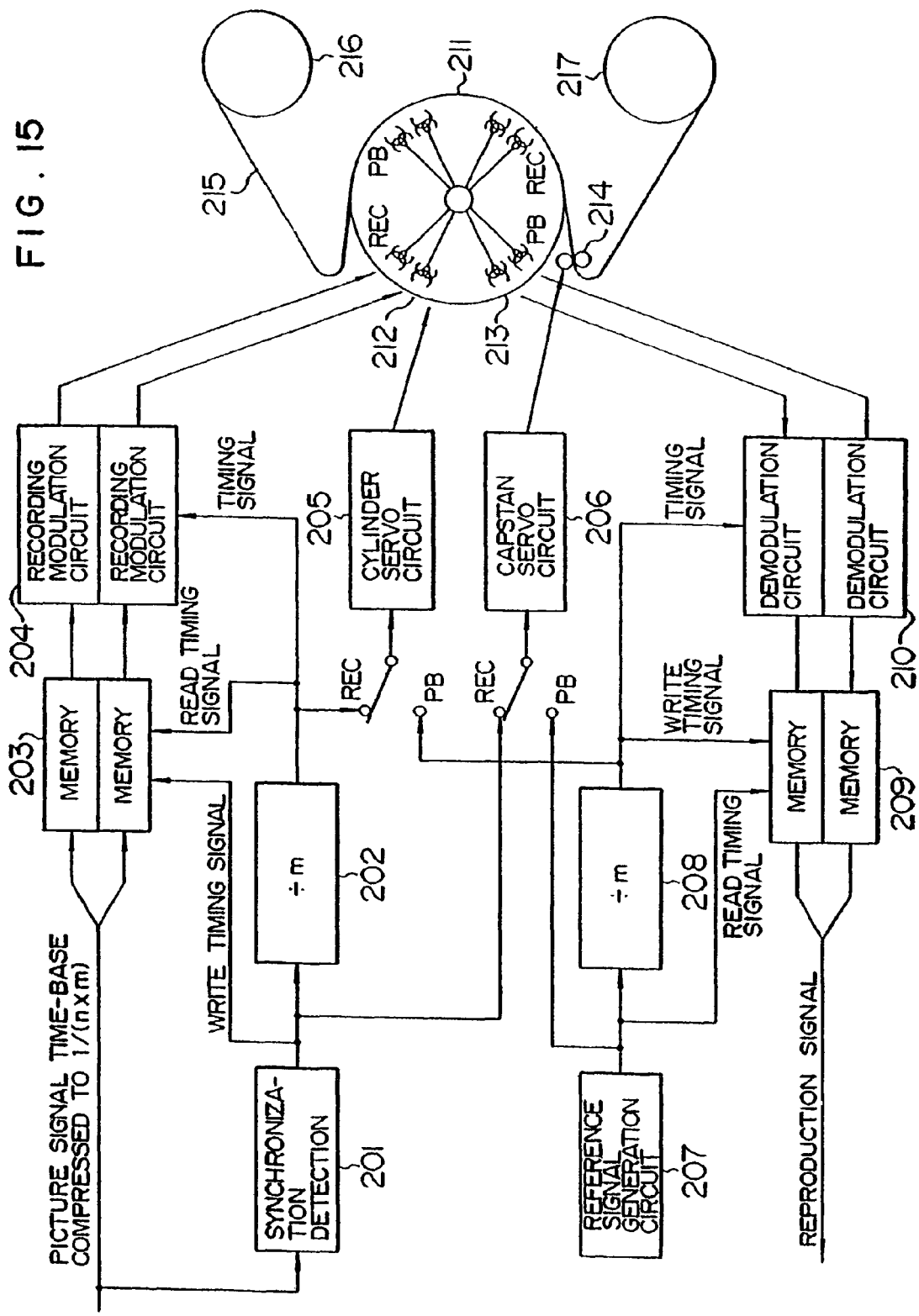
FIG. 15 is a block diagram for explaining another example of the operation of the embodiment shown in FIG. 7.

FIG. 15 is a block diagram of another example of the magnetic recording/reproducing system of the embodiment of FIG. 7 for explaining processings subsequent to the compression processing. FIG. 16 is a timing chart of input and output signals in the example shown in FIG. 15. In FIG. 15, the same reference numerals as those used in FIG. 13 denote the same or equivalent components as or to those shown in FIG. 13. In FIG. 15, reference numeral 202 denotes a ÷m circuit, numeral 203 recording system memories, numeral 208 a ÷m circuit, and numeral 209 reproducing system memories. In FIG. 16, the same reference numerals as those used in FIG. 14 denote the same or equivalent signals as or to those shown in FIG. 14. In FIG. 16, reference numeral 253 denotes outputs of the recording system memories 203 and numeral 254 denotes an output of the ÷m circuit 208 or a synchronizing signal divided by m.

The embodiment shown in FIG. 15 is an example in which m pairs of recording heads are used to simultaneously record magnetic signals for m pictures on m tracks, thereby realizing high-speed recording while suppressing an increase in the cylinder rotation speed. Upon reproduction, m pairs of reproducing heads are used. Though FIG. 15 shows the case where two pairs of recording heads 212 are used to simultaneously record information for two pictures on two tracks, three or more pairs of heads can be used in a similar manner.

FIG. 17 is a table showing some examples of the tape speed and the cylinder rotation speed (rpm) in the embodiments shown in FIGS. 13 and 15. In the table, high-speed recording or reproduction at a speed ten times as high as the standard speed is shown by way of example. Design for implementing another high-speed recording or reproduction is similarly possible. In the table shown in FIG. 17, examples ①, ② and ③ correspond to the embodiment shown in FIG. 13 and examples ④ and ⑤ correspond to the embodiment shown in FIG. 15.

A still furthermore embodiment of a digital signal recording/reproducing system of the present invention will be explained by use of a block diagram shown in FIG. 18.

In FIG. 18, reference numeral 501 denotes a signal input terminal to which a plurality of video signals are inputted in a time-division multiplex form, numeral 502 a recording selection signal-input terminal to which a recording selection signal for selecting one or plural signals to be recorded from the multiplexed input signal is inputted, numeral 503 a recording signal selection circuit for selecting the signals to be recorded from the multiplexed input signal in accordance with the recording selection signal from the input terminal 502, numeral 504 a recording signal processing circuit for subjecting the selected signals to a digital processing for recording onto a recording medium, numerals 505 and 505' magnetic heads, numeral 506 a rotating drum, numeral 507 a magnetic tape or the recording medium, numeral 508 a servo circuit for controlling the rotation of the drum 506 and the travel of the tape 507, numeral 511 a reproduction selection signal input terminal to which a reproduction selection signal for selecting one or plural signals to be outputted as a reproduction signal from among the multiple-recorded and reproduced signals is inputted, numeral 509 a reproduction signal selection circuit for selecting the signals to be outputted as a reproduction signal from among the multiple-recorded and reproduced signals in accordance with the reproduction selection signal from the input terminal 511, numeral 510 a reproduction signal processing circuit for subjecting the selected signals to a digital processing, and numeral 512 a reproduction signal output terminal.

Figure 19:
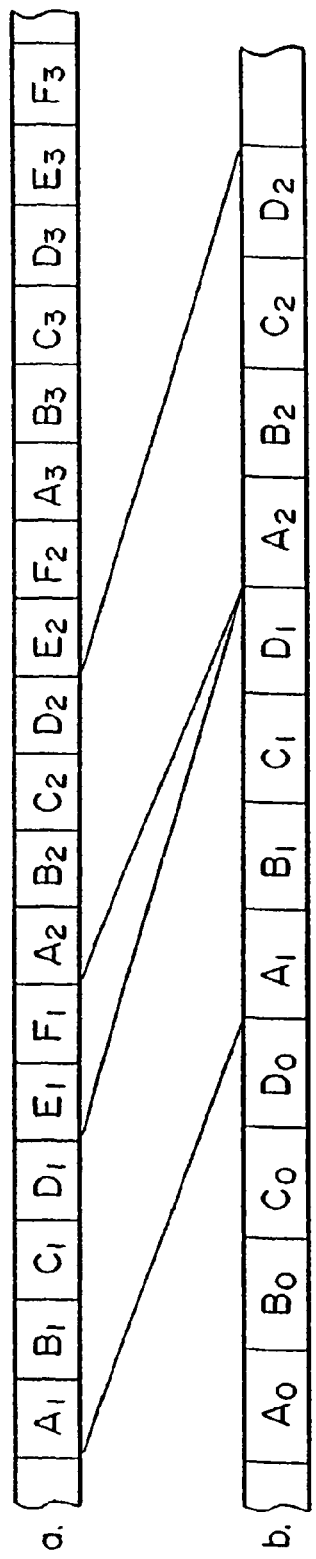
FIGS. 19 and 20 are signal diagrams for explaining different operations of the embodiment shown in FIG. 18.
Figure 20:
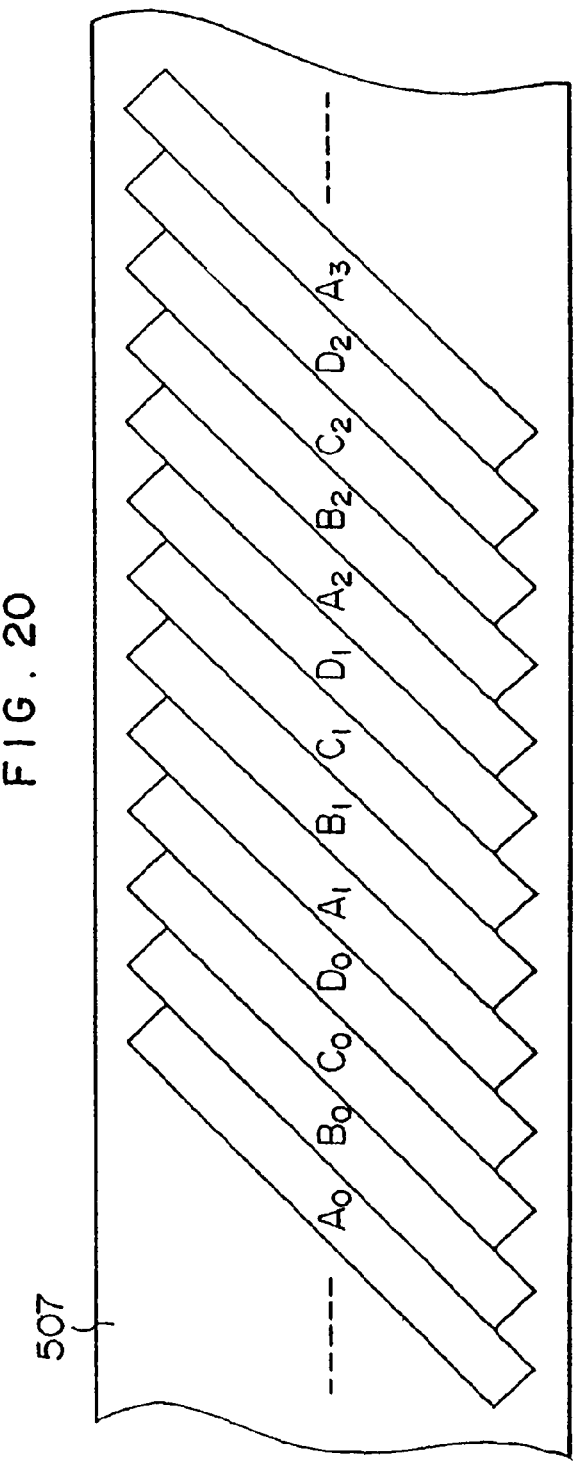

The time-division multiplexed input video signal from the signal input terminal 501 is supplied to the recording signal selection circuit 503. The recording signal selection circuit 503 is also supplied with the recording selection signal from the recording selection signal input terminal 502 to make the selection of signals to be recorded. For example, in the case where six kinds of video signals A, B, C, D, E and F are inputted in a time-division multiplex form as shown in (a) of FIG. 19 and four signals A, B, C and D thereof are to be selected and recorded, an output of the recording signal selection circuit 503 is as shown in (b) of FIG. 19. Such an output signal of the recording signal selection circuit 503 is inputted to the recording signal processing circuit 504 which in turn performs a signal processing for recording such as addition of error correction code. Also, the recording signal selection circuit 503 produces a speed control signal on the basis of the number of signals in the time-division multiplexed input video signal, the transmission rate of the input signal and the number of signals to be recorded which are selected by the recording selection signal. The speed control signal is supplied to the recording signal processing circuit 504 and the servo circuit 508. For example, in the case where the input video signal is time-division multiplexed to sextuplet with each of six signals in the multiplexed input signal being transmitted at a rate time-base compressed to ⅙ and four signals among the six signals in the multiplexed input signal are to be selectively recorded, a signal indicative of a quadruple speed is produced as the speed control signal. Also, in the case where the input video signal is time-division multiplexed to sextuplet with each of six signals in the multiplexed input signal being transmitted at a rate time-base compressed to 1/12 and four signals among the six signals in the multiplexed input signal are to be selectively recorded, a signal indicative of a octuple speed is produced as the speed control signal. Namely, in the case where an input signal is multiplexed to N-plet, the compression rate of each of the N signals in the multiplexed input signal is 1/K and the number of signals to be selectively recorded is L, a speed control signal indicative of an (L×K)/N-tuple speed is produced. The operating speed of the recording signal processing circuit 504 which processes a signal from the recording signal selection circuit 503, is changed in accordance with the speed control signal. For example, in the case of a speed control signal indicative of a quadruple speed, the recording signal processing circuit 504 performs a signal processing at a speed four times as high as a normal speed and supplies the processed signal to the magnetic heads 505 and 505'. Here, for example, in the case where the input video signal is time-division multiplexed to sextuplet with each of the six signals in the multiplexed input signal being transmitted at a rate time-base compressed to ⅙ and a speed control signal indicative of a quadruple speed is used to selectively record four signals from among the six signals, the speed of an input signal inputted to the recording signal processing circuit 504 is four times as high as that of one video signal having a normal speed and the recording signal processing circuit 504 processes this quadruple-speed input signal at a quadruple speed and supplies the processed signal to the magnetic heads, thereby making it possible to record all of the four selected signals. Also, if the recording signal selection circuit 503 is constructed so that signals to be selectively recorded are sequentially changed for every one track on the tape, compatibility can be held in regard to the number of signals to be selectively recorded and a processing speed by causing the recording signal processing circuit 504 to perform a completed processing for every one track. In the following, explanation will be made in conjunction with the case where each video signal is recorded in such a form completed for every track. However, it should be noted in advance that the present invention is applicable to another recording system, for example, a system in which signals are recorded in a form changed for every pixel, line or field. On the other hand, the servo circuit 508 supplied with the speed control signal indicative of the quadruple speed controls the rotation speed of the rotating drum 506 so that it becomes four times as high as a normal speed and the travel speed of the magnetic tape 507 so that it becomes four times as high as a normal speed. Thereby, four signals A, B, C and D are alternately recorded on successive tracks of the magnetic tape 507, as shown in FIG. 20. According to the control mentioned above, the pattern of recording tracks on the tape becomes the same irrespective of the number of signals in the multiplexed input signal, the transmission rate of each signal and the number of signals to be selectively recorded. In order to make a control upon reproduction easy, it is preferable that the number of selectively recorded signals and the identification codes or signal numbers thereof (for example, A, B, C and D or 0, 1, 2 and 3) are recorded as an ID signal for every track.

In the above example, the recording of the time-division multiplexed signal has been mentioned. However, it is needless to say that the present invention is also applicable to the case where the number of multipet signal components in an input video signal is 1 or the input video signal is not multiplexed. In such a case, since the recording signal processing circuit 504 and the servo circuit 508 operate at speeds proportional to the transmission rate of the input video signal, an effect is manifested, for example, in high-speed dubbing. As apparent from the foregoing explanation of the operation, it is of course that a multiplexed signal can be recorded at a high speed.

Upon reproduction, a signal reproduced from the magnetic tape 507 by the magnetic heads 505 and 505' mounted on the rotating drum 506 is inputted to the reproduction signal selection circuit 509. The reproduction signal selection circuit 509 produces a speed control signal, for example, by detecting the number of multiple-recorded signals from the ID signal included in the reproduced signal and sends the speed control signal to the servo circuit 508. The speed control signal is a signal indicative of a speed four times as high as the normal reproduction speed in the case where the number of multiple-recorded signals is 4 and a signal indicative of a sextuple speed in the case where it is 6. In the case of the quadruple speed, the servo control circuit 508 supplied with the speed control signal indicative of the quadruple speed controls the rotation speed of the rotating drum 506 so that it becomes four times as high as a normal speed and the travel speed of the magnetic tape 7 so that it becomes four times as high as a normal speed. Thereby, there can be traced all of signals recorded so that the recording track pattern on the tape becomes the same irrespective of the number of signals to be selectively recorded. In a system which has not a signal indicative of the number of selectively recorded signals, there may be employed a method in which the speed control signal is manually set. In a system in which the number of signals to be recorded on the tape is fixed, the speed control signal has a fixed value. The reproduction signal selection circuit 509 receives a reproduction selection signal inputted from the reproduction selection signal input terminal 511 to select a desired signal(s) from among the signals reproduced by the magnetic heads 505 and 505' and to output the selected signal as a reproduction signal to the reproduction signal processing circuit 510. The reproduction signal selection circuit 509 also outputs a selection number signal indicative of the number of selected signals to the reproduction signal processing circuit 510.

The reproduction signal processing circuit 510 performs a signal processing such as code error correction processing and picture signal processing for the reproduction signal at a processing speed corresponding, to the selection number signal and outputs the processed reproduction signal from the output terminal 512. For example, in the case where the number indicated by the selection number signal is 2, the signal processing speed is two times as high as a normal speed and various processings are performed for each selected signal. For example, in the case where signals A and C are selected, the signals A and C are outputted alternately for each field. In the case where the number indicated by the selection number signal is 1, for example, when the reproduction selection signal from the reproduction selection signal input terminal 511 selects only the signal C, the reproduction signal processing circuit 510 performs the signal processing at the normal speed to output the signal as reproduced at a normal speed. As apparent from the above, the present embodiment makes it possible to simultaneously record any number of signals selected from among a plurality of signals in a multiplexed video signal and to simultaneously reproduce any number of signals from among the recorded signals.

In the case where a plurality of signals are simultaneously reproduced, a construction for outputting the reproduced signals from separate output terminals simultaneously and in parallel may be employed, particularly, in the case of an analog output, as a method other than the construction in which the plurality of reproduced signals are outputted in a time-division multiplex form, as mentioned above. Though in the above-mentioned example the reproduction signal is outputted at a reproduction speed for a usual video signal, the transmission rate of the reproduction signal may be made higher than the reproduction speed for the usual video signal in order to transmit the reproduction signal to another system in an analog or digital signal form at a high rate or to perform high-speed dubbing which is one of effects of the present embodiment. This can be realized in such a manner that the fundamental operating speed of there producing system is set to be higher than a normal reproduction speed and the operating speeds of the servo circuit 508, the reproduction signal selection circuit 509 and the reproduction signal processing circuit 510 are changed in accordance with the number of multiple-recorded signals and/or the number of signals to be outputted as a reproduction signal with the above fundamental speed being the standard. If the transmission rate of a reproduction signal is made variable so that a rate adapted for a transmission path to which the reproduction signal is to be connected or the performance or function of a recorder by which the reproduction signal is to be recorded, can be selected.

As mentioned above, according to the present embodiment, it is possible to simultaneously record any number of signals selected from among a plurality of signals in a multiplexed video signal and to reproduce any number of signals from among the recorded signals at any speed. Also, in the case where a plurality of signals are selected and reproduced and the plurality of reproduced signals are simultaneously outputted in a time-division multiplex form or from separate output terminals in parallel, it is possible to arbitrarily set the transmission rate of an output signal.

The present embodiment has been explained in conjunction with the case where the present invention is applied to a helical-scan digital-recording VTR. It is of course that a similar effect can be obtained in the case where the present invention is applied to a fixed head VTR. The fixed head system is convenient for the structuring of a system since it has a higher degree of freedom for the setting of the units of division of a signal subjected to time-division multiple recording as compared with the helical scan system. Also, it is of course that the present invention is applicable to a recording/reproducing equipment other than the VTR or is applicable to a digital signal processing and analog recording system.

The present invention can be applied to not only the case where an input signal is time-division multiplexed, as mentioned above, but also the case where a plurality of signals are inputted simultaneously and in parallel. In the latter case, the recording signal selection circuit 503 is constructed to receive the input signals in parallel.

As has been mentioned in the foregoing, according to the present invention, it is possible to realize a digital VTR in which high-speed recording onto a tape can be made with the same format as that used in standard-speed reproduction. Further, there can be realized a transmission signal processing for transmitting at a high rate a video signal to be recorded by such a digital VTR. Also, in the case where a signal transmitted from the transmission signal processing system is to be recorded by a multiplicity of VTR's, it is possible to designate those ones of the multiplicity of VTR's by which recording is to be made and to make a control of the start/stop of recording.

What is claimed is:

1. A digital information receiving apparatus, comprising:
   a receiver configured to receive digital information from a transmission path, wherein the digital information includes video information bit-compressed by a first compression method, audio information bit-compressed by a second compression method which is different from the first compression method, and error detection information added to the video information and separately added to the audio information, respectively;
   a demodulator configured to demodulate the digital information received by the receiver;
   an error detector configured to detect an error which occurs in the transmission path of the digital information demodulated by the demodulator based on the error detection information, the error being the error which occurs in the transmission path having no recording process of the digital information therein;
   a first expander configured to bit-expand the video information of the digital information error detected by the error detector in accordance with a first expansion method corresponding to the first compression method; and
   a second expander configured to bit-expand the audio information of the digital information error detected by the error detector in accordance with a second expansion method corresponding to the second compression method.

2. A digital information receiving apparatus, according to claim 1, wherein the first compression method utilizes a discrete cosine transform.

3. A digital information receiving apparatus, comprising:
   a receiver configured to receive digital information from a transmission path, wherein the digital information includes video information bit-compressed by a first compression method, audio information bit-compressed by a second compression method which is different from the first compression method, and error correction information added to the video information and separately added to the audio information, respectively;
   a demodulator configured to demodulate the digital information received by the receiver;
   an error corrector configured to correct an error which occurs in the transmission path of the digital information demodulated by the demodulator based on the error correction information, the error being the error which occurs in the transmission path having no recording process of the digital information therein;
   a first expander configured to bit-expand the video information of the digital information error corrected by the error corrector in accordance with a first expansion method corresponding to the first compression method; and
   a second expander configured to bit-expand the audio information of the digital information error corrected by the error corrector in accordance with a second expansion method corresponding to the second compression method.

4. A digital information receiving apparatus, according to claim 3, wherein the first compression method utilizes a discrete cosine transform.

5. A digital information receiving and recording apparatus comprising:
   a receiver configured to receive digital information from a transmission path, wherein the digital information includes video information bit-compressed by a first compression method, audio information bit-compressed by a second compression method which is different from the first compression method, and transmission error correction information added to the video information and separately added to the audio information, respectively;
   an error corrector configured to correct an error of the digital information received by the receiver based on the transmission error correction information, the error being the error which occurs in the transmission path having no recording process of the digital information therein;

a record error correction information adder configured to add record error correction information to the video information and the audio information error corrected by the error corrector, the record error correction information being different from the transmission error correction information; and a recorder configured to record the digital information added the record correction information by the record error correction information adder to the recording medium.

6. A digital information receiving and recording apparatus, according to claim 5, wherein the first compression method utilizes a discrete cosine transform.

7. A method for receiving digital information of a digital information receiving apparatus, comprising the steps of:

receiving the digital information from a transmission path, wherein the digital information includes video information bit-compressed by a first compression method, audio information bit-compressed by a second compression method which is different from the first compression method, and error detection information added to the video information and separately added to the audio information, respectively;

demodulating the digital information received by the receiving step;

detecting an error of the digital information demodulated by the demodulating step based on the error detection information, the error being the error which occurs in the transmission path having no recording process of the digital information therein;

bit-expanding the video information of the digital information error detected by the error detecting step in accordance with a first expansion method corresponding to the first compression method; and bit-expanding the audio information of the digital information error detected by the error detecting step in accordance with a second expansion method corresponding to the second compression method.

8. A method for receiving digital information of a digital information receiving apparatus, according to claim 7, wherein the first compression method utilizes a discrete cosine transform.

9. A method for receiving a digital information of a digital information receiving apparatus, comprising the steps of:

receiving digital information from a transmission path, wherein the digital information includes video information bit-compressed by a first compression method, audio information bit-compressed by a second compression method which is different from the first compression method, and error correction information added to the video information and separately added to the audio information, respectively;

demodulating the digital information received by the receiving step;

correcting an error of the digital information demodulated by the demodulating step based on the error correction information, the error being the error which occurs in the transmission path having no recording process of the digital information therein;

bit-expanding the video information of the digital information by the error correcting step in accordance with a first expansion method corresponding to the first compression method; and bit-expanding the audio information of the digital information error corrected by the error correcting step in accordance with a second expansion method corresponding to the second compression method.

10. A method for receiving a digital information of a digital information receiving apparatus, according to claim 9, wherein the first compression method utilizes a discrete cosine transform.

11. A method for receiving a digital information of a digital information receiving apparatus, comprising the steps of:

receiving digital information from a transmission path, wherein the digital information includes video information bit-compressed by a first compression method, audio information bit-compressed by a second compression method which is different from the first compression method, and transmission error correction information added to the video information and separately added to the audio information, respectively;

correcting an error of the digital information received by the receiving step based on the transmission error correction information, the error being the error which occurs in the transmission path having no recording process of the digital information therein;

adding record error correction information to the video information and the audio information error corrected by the error correcting step, the record error correction information being different from the transmission error correction information; and recording the digital information having the record correction information added by the adding step to the recording medium.

12. A method for receiving a digital information of a digital information receiving apparatus, according to claim 11, wherein the first compression method utilizes a discrete cosine transform.

13. A digital information receiving apparatus, comprising:

receiving means for receiving digital information from a transmission path, wherein the digital information includes video information bit-compressed by a first compression method, audio information bit-compressed by a second compression method which is different from the first compression method, and error detection information added to the video information and separately added to the audio information, respectively;

demodulating means for demodulating the digital information received by the receiving means;

error detecting means for detecting an error of the digital information demodulated by the demodulating means based on the error detection information, the error being the error which occurs in the transmission path having no recording process of the digital information therein;

first expanding means for bit-expanding the video information of the digital information error detected by the error detecting means in accordance with a first expansion method corresponding to the first compression method; and second expanding means for bit-expanding the audio information of the digital information error detected by the error detecting means in accordance with a second expansion method corresponding to the second compression method.

14. A digital information receiving apparatus, according to claim 13, wherein the first compression method utilizes a discrete cosine transform.

15. A digital information receiving apparatus, comprising;

receiving means for receiving digital information from a transmission path, wherein the digital information includes video information bit-compressed by a first compression method, audio information bit-compressed by a second compression method which is different from the first compression method, and error correction information added to the video information and separately added to the audio information, respectively;

demodulating means for demodulating the digital information received by the receiving means;

error correcting means for correcting an error of the digital information demodulated by the demodulating means based on the error correction information, the error being the error which occurs in the transmission path having no recording process of the digital information therein;

first expanding means for bit-expanding the video information of the digital information error corrected by the error correcting means in accordance with a first expansion method corresponding to the first compression method; and second expanding means for bit-expanding the audio information of the digital information error corrected by the error correcting means in accordance with a second expansion method corresponding to the second compression method.

16. A digital information receiving apparatus, according to claim 15, wherein the first compression method utilizes a discrete cosine transform.

17. A digital information receiving apparatus, comprising:
a receiver configured to receive digital information from a transmission path, wherein the digital information includes video information bit-compressed by a first compression method, audio information bit-compressed by a second compression method which is different from the first compression method, and error detection information added to the video information and separately added to the audio information, respectively;
a demodulator configured to demodulate a digital information which is previously received by the receiver;
an error detector configured to detect an error of a digital information which is previously demodulated by the demodulator based on the error detection information, the error being the error which occurs in the transmission path having no recording process of a digital information therein;
a first expander configured to bit-expand the video information of a digital information which is previously error detected by the error detector in accordance with a first expansion method corresponding to the first compression method; and
a second expander configured to bit-expand the audio information of a digital information which is previously error detected by the error detector in accordance with a second expansion method corresponding to the second compression method.

18. A digital information receiving apparatus, according to claim 17, wherein the first compression method utilizes a discrete cosine transform.

19. A digital information receiving apparatus, comprising;
a receiver configured to receive digital information from a transmission path, wherein the digital information includes video information bit-compressed by a first compression method, audio information bit-compressed by a second compression method which is different from the first compression method, and error correction information added to the video information and separately added to the audio information, respectively;
a demodulator configured to demodulate a digital information which is previously received by the receiver;
an error corrector configured to correct an error of a digital information which is previously demodulated by the demodulator based on the error correction information, the error being the error which occurs in the transmission path having no recording process of a digital information therein;
a first expander configured to bit-expand the video information of a digital information which is previously error corrected by the error corrector in accordance with a first expansion method corresponding to the first compression method; and
a second expander configured to bit-expand the audio information of a digital information which is previously error corrected by the error corrector in accordance with a second expansion method corresponding to the second compression method.

20. A digital information receiving apparatus, according to claim 19, wherein the first compression method utilizes a discrete cosine transform.

21. A digital information receiving apparatus, comprising:
receiving means for receiving digital information from a transmission path, wherein the digital information includes video information bit-compressed by a first compression method, audio information bit-compressed by a second compression method which is different from the first compression method, and error detection information added to the video information and separately added to the audio information, respectively;
demodulating means for demodulating a digital information which is previously received by the receiving means;
error detecting means for detecting an error of a digital information which is previously demodulated by the demodulating means based on the error detection information, the error being the error which occurs in the transmission path having no recording process of a digital information therein;
first expanding means for bit-expanding the video information of a digital information which is previously error detected by the error detecting means in accordance with a first expansion method corresponding to the first compression method; and
second expanding means for bit-expanding the audio information of a digital information which is previously error detected by the error detecting means in accordance with a second expansion method corresponding to the second compression method.

22. A digital information receiving apparatus, according to claim 21, wherein the first compression method utilizes a discrete cosine transform.

23. A digital information receiving apparatus, comprising;
receiving means for receiving digital information from a transmission path, wherein the digital information includes video information bit-compressed by a first compression method, audio information bit-compressed by a second compression method which is different from the first compression method, and error correction information added to the video information and separately added to the audio information, respectively;
demodulating means for demodulating a digital information which is previously received by the receiving means;
error correcting means for correcting an error of a digital information which is previously demodulated by the demodulating means based on the error correction information, the error being the error which occurs in the transmission path having no recording process of a digital information therein;

first expanding means for bit-expanding the video information of a digital information which is previously error corrected by the error correcting means in accordance with a first expansion method corresponding to the first compression method; and second expanding means for bit-expanding the audio information of a digital information which is previously error corrected by the error correcting means in accordance with a second expansion method corresponding to the second compression method.

24. A digital information receiving apparatus, according to claim 23, wherein the first compression method utilizes a discrete cosine transform.

25. A digital information receiving apparatus, comprising;

a receiver configured to receive digital information transmitted in electric wave form from a transmission path, wherein the digital information includes video information bit-compressed by a first compression method, audio information bit-compressed by a second compression method which is different from the first compression method, and error correction information added to the video information and separately added to the audio information, respectively;

a demodulator configured to demodulate the digital information received by the receiver;

an error corrector configured to correct an error of the digital information demodulated by the demodulator based on the error correction information, the error being the error which occurs in the transmission path having no recording process of the digital information therein;

a first expander configured to bit-expand the video information of the digital information error corrected by the error corrector in accordance with a first expansion method corresponding to the first compression method; and a second expander configured to bit-expand the audio information of the digital information error corrected by the error corrector in accordance with a second expansion method corresponding to the second compression method.

26. A digital information receiving apparatus, according to claim 25, wherein the first compression method utilizes a discrete cosine transform.

27. A method for receiving a digital information of a digital information receiving apparatus, comprising the steps of:

receiving digital information transmitted in electric wave form from a transmission path, wherein the digital information includes video information bit-compressed by a first compression method, audio information bit-compressed by a second compression method which is different from the first compression method, and error correction information added to the video information and separately added to the audio information, respectively;

demodulating the digital information received by the receiving step;

correcting an error of the digital information demodulated by the demodulating step based on the error correction information, the error being the error which occurs in the transmission path having no recording process of the digital information therein;

bit-expanding the video information of the digital information by the error correcting step in accordance with a first expansion method corresponding to the first compression method; and bit-expanding the audio information of the digital information error corrected by the error correcting step in accordance with a second expansion method corresponding to the second compression method.

28. A method for receiving a digital information of a digital information receiving apparatus, according to claim 27, wherein the first compression method utilizes a discrete cosine transform.

29. A digital information receiving apparatus, comprising;

a receiver configured to receive digital information transmitted in electric wave form from a transmission path, wherein the digital information includes video information bit-compressed by a first compression method, audio information bit-compressed by a second compression method which is different from the first compression method, and error correction information added to the video information and separately added to the audio information, respectively;

a demodulator configured to demodulate a digital information which is previously received by the receiver;

an error corrector configured to correct an error of a digital information which is previously demodulated by the demodulator based on the error correction information, the error being the error which occurs in the transmission path having no recording process of a digital information therein;

a first expander configured to bit-expand the video information of a digital information which is previously error corrected by the error corrector in accordance with a first expansion method corresponding to the first compression method; and a second expander configured to bit-expand the audio information of a digital information which is previously error corrected by the error corrector in accordance with a second expansion method corresponding to the second compression method.

30. A digital information receiving apparatus, according to claim 29, wherein the first compression method utilizes a discrete cosine transform.

31. A digital information receiving apparatus, according to claim 1, further comprising:

a control signal detector configured to detect control signal information generated by a control signal generator.

32. A digital information receiving apparatus, according to claim 31, further comprising:

a parity addition circuit configured to add parities to the control signal information.

* * * * *

UNITED STATES PATENT AND TRADEMARK OFFICE
CERTIFICATE OF CORRECTION

| | | |
|---|---|---|
| PATENT NO. | : 8,009,375 B2 | Page 1 of 1 |
| APPLICATION NO. | : 11/305229 | |
| DATED | : August 30, 2011 | |
| INVENTOR(S) | : H. Arai et al. | |

It is certified that error appears in the above-identified patent and that said Letters Patent is hereby corrected as shown below:

Title Page

Under the head (*) Notice:

Please delete the sentence "This patent is subject to a Terminal Disclaimer."

Signed and Sealed this
Eighteenth Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,009,375 B2 | |
| APPLICATION NO. | : 11/305229 | |
| DATED | : August 30, 2011 | |
| INVENTOR(S) | : H. Arai et al. | |

It is certified that error appears in the above-identified patent and that said Letters Patent is hereby corrected as shown below:

Title Page

Item (60): on line 18 of 'Related U.S. Application Data,' immediately following the listing of Pat. No. 5,862,004, – please insert the following -- which is a continuation of application No. 08/620,880, filed Mar. 22, 1996, now Pat. No. 5,673,154, --

Signed and Sealed this
Fourteenth Day of February, 2012

David J. Kappos
*Director of the United States Patent and Trademark Office*

UNITED STATES PATENT AND TRADEMARK OFFICE
CERTIFICATE OF CORRECTION

PATENT NO. : 8,009,375 B2  
APPLICATION NO. : 11/305229  
DATED : August 30, 2011  
INVENTOR(S) : H. Arai et al.

It is certified that error appears in the above-identified patent and that said Letters Patent is hereby corrected as shown below:

Title Page

Item (60): on line 18 of 'Related U.S. Application Data,' immediately following the listing of Pat. No. 5,699,203, – please insert the following -- which is a continuation of application No. 08/620,880, filed Mar. 22, 1996, now Pat. No. 5,673,154, --

This certificate supersedes the Certificate of Correction issued February 14, 2012.

Signed and Sealed this
Twenty-fifth Day of September, 2012

David J. Kappos
*Director of the United States Patent and Trademark Office*